US007464108B1

(12) United States Patent
Sorensen et al.

(10) Patent No.: US 7,464,108 B1
(45) Date of Patent: Dec. 9, 2008

(54) MANAGEMENT AND PUBLICATION OF IDEAS FOR INVENTIONS ACCUMULATED IN A COMPUTER DATABASE

(75) Inventors: Jens Erik Sorensen, 14431 Bellvista Dr., Rancho Santa Fe, CA (US) 92067; Jens Ole Sorensen, Grand Cayman (KY)

(73) Assignees: Sorensen Research and Development Trust, San Diego, CA (US); Jens Erik Sorensen, San Diego, CA (US)

( * ) Notice: Subject to any disclaimer, the term of this patent is extended or adjusted under 35 U.S.C. 154(b) by 617 days.

(21) Appl. No.: 10/309,384

(22) Filed: Nov. 25, 2002

Related U.S. Application Data

(60) Division of application No. 10/072,071, filed on Feb. 8, 2002, which is a continuation-in-part of application No. 09/980,654, filed on Oct. 25, 2001.

(51) Int. Cl.
  *G06F 17/00* (2006.01)
  *G06F 7/00* (2006.01)
(52) U.S. Cl. .................. 707/104.1; 707/10; 705/7; 705/10
(58) Field of Classification Search ........... 707/1–104.1
  See application file for complete search history.

(56) References Cited

U.S. PATENT DOCUMENTS

| 5,566,291 A | 10/1996 | Boulton et al. ............. 345/709 |
| 5,584,025 A | 12/1996 | Keithley et al. ........... 707/104.1 |
| 5,754,840 A | 5/1998 | Rivette et al. .................. 707/2 |
| 5,794,053 A | 8/1998 | Doris, Jr. et al. ............ 717/162 |
| 5,794,207 A | 8/1998 | Walker et al. .................. 705/1 |
| 5,802,518 A | 9/1998 | Karaev et al. .................. 707/9 |
| 5,805,889 A | 9/1998 | Van de vanter ............. 717/107 |
| 5,924,072 A | 7/1999 | Havens ........................ 705/1 |
| 5,958,012 A | 9/1999 | Battat et al. ................. 709/224 |
| 5,999,907 A | 12/1999 | Donner ........................ 705/1 |
| 6,018,714 A | 1/2000 | Risen, Jr. et al. .............. 705/4 |
| 6,070,149 A | 5/2000 | Tavor et al. .................. 705/26 |

(Continued)

FOREIGN PATENT DOCUMENTS

EP  1 296 274  3/2003

(Continued)

OTHER PUBLICATIONS

Kein, K. "BrightIdea.com Gets Consumers in Focus", dmnews.com, Oct. 17, 2000.*

(Continued)

*Primary Examiner*—Luke S Wassum
(74) *Attorney, Agent, or Firm*—Knobbe Martens Olson & Bear LLP

(57) ABSTRACT

A method of managing ideas includes the following steps: (a) maintaining a computer database for accumulating ideas for prospectively patentable inventions; (b) systematically establishing contractual obligations by contributors of said ideas to said database to transfer property rights to inventions respectively derived at least in part from said contributed ideas to a proprietor of said database or to a party in concert with said proprietor; and (c) prior to filing any patent applications for inventions respectively derived at least in part from said accumulated ideas, systematically publishing said accumulated ideas.

4 Claims, 93 Drawing Sheets

U.S. PATENT DOCUMENTS

| | | | |
|---|---|---|---|
| 6,101,490 A * | 8/2000 | Hatton | 706/55 |
| 6,131,085 A | 10/2000 | Rossides | 705/1 |
| 6,157,947 A | 12/2000 | Watanabe et al. | 709/217 |
| 6,195,652 B1 | 2/2001 | Fish | 707/2 |
| 6,219,674 B1 | 4/2001 | Classen | 707/104.1 |
| 6,263,314 B1 | 7/2001 | Donner | 705/1 |
| 6,269,356 B1 * | 7/2001 | Hatton | 706/55 |
| 6,289,380 B1 | 9/2001 | Battat et al. | 709/224 |
| 6,298,327 B1 | 10/2001 | Hunter et al. | 705/1 |
| 6,415,267 B1 | 7/2002 | Hagan | 705/36 R |
| 6,529,905 B1 | 3/2003 | Bray et al. | 707/8 |
| 6,542,871 B1 | 4/2003 | Harshaw | 705/7 |
| 2001/0010041 A1 | 7/2001 | Harshaw | 705/10 |
| 2001/0010050 A1 * | 7/2001 | Sakata | 707/526 |
| 2001/0032144 A1 | 10/2001 | Magid | 705/26 |
| 2001/0032189 A1 | 10/2001 | Powell | 705/59 |
| 2001/0034629 A1 | 10/2001 | Cronin | 705/7 |
| 2001/0034739 A1 | 10/2001 | Anecki et al. | 715/500 |
| 2001/0045960 A1 | 11/2001 | Keeley | 345/637 |
| 2001/0047276 A1 | 11/2001 | Eisenhart | 705/1 |
| 2001/0049707 A1 | 12/2001 | Tran | 715/530 |
| 2002/0002481 A1 | 1/2002 | Uchio et al. | 705/9 |
| 2002/0002523 A1 | 1/2002 | Kossovsky et al. | 705/36 R |
| 2002/0004775 A1 | 1/2002 | Kossovsky et al. | 705/37 |
| 2002/0010711 A1 | 1/2002 | Nakanishi et al. | 715/501.1 |
| 2002/0016727 A1 | 2/2002 | Harrell et al. | 705/7 |
| 2002/0019836 A1 | 2/2002 | Uchio et al. | 707/511 |
| 2002/0029215 A1 | 3/2002 | Whitmyer, Jr. | 707/10 |
| 2002/0032659 A1 | 3/2002 | Waters | 705/54 |
| 2002/0038321 A1 | 3/2002 | Keeley | 715/514 |
| 2002/0046038 A1 | 4/2002 | Prokoski | 705/1 |
| 2002/0046071 A1 | 4/2002 | Walker | 705/7 |
| 2002/0055935 A1 | 5/2002 | Rosenblum | 707/104.1 |
| 2002/0062243 A1 | 5/2002 | Anderson | 705/10 |
| 2002/0077846 A1 | 6/2002 | Bierbrauer et al. | 705/1 |
| 2002/0078152 A1 | 6/2002 | Boone | 709/204 |
| 2002/0082890 A1 | 6/2002 | Bracchitta et al. | 705/8 |
| 2002/0082973 A1 | 6/2002 | Marbach et al. | 705/37 |
| 2002/0087534 A1 | 7/2002 | Blackman et al. | 707/4 |
| 2002/0091543 A1 | 7/2002 | Thakur | 705/1 |
| 2002/0095305 A1 * | 7/2002 | Gakidis et al. | 705/1 |
| 2002/0095368 A1 | 7/2002 | Tran | 705/37 |
| 2002/0099711 A1 | 7/2002 | Robertson | 707/100 |
| 2002/0103654 A1 | 8/2002 | Poltorak | 705/1 |
| 2002/0103682 A1 | 8/2002 | Stemmer et al. | 705/7 |
| 2002/0107722 A1 | 8/2002 | Laurin et al. | 705/10 |
| 2002/0107809 A1 | 8/2002 | Biddle et al. | 705/59 |
| 2002/0111817 A1 | 8/2002 | Cronin | 705/1 |
| 2002/0111824 A1 | 8/2002 | Grainger | 705/1 |
| 2002/0116395 A1 | 8/2002 | Christensen | 707/104.1 |
| 2002/0128848 A1 | 9/2002 | Wheelock | 705/1 |
| 2002/0128849 A1 | 9/2002 | Wheelock | 705/1 |
| 2002/0156850 A1 | 10/2002 | Hamscher et al. | 709/205 |
| 2002/0178120 A1 | 11/2002 | Reid et al. | 705/59 |
| 2002/0184130 A1 * | 12/2002 | Blasko | 705/35 |
| 2002/0188638 A1 | 12/2002 | Hamscher | 715/530 |
| 2002/0198843 A1 | 12/2002 | Wang et al. | 705/51 |
| 2002/0198847 A1 | 12/2002 | Fahraeus | 705/59 |
| 2003/0004843 A1 | 1/2003 | Frain | 705/35 |
| 2003/0014311 A1 | 1/2003 | Chua | 705/14 |
| 2003/0023527 A1 | 1/2003 | Wilce et al. | 705/35 |
| 2003/0023563 A1 | 1/2003 | Kutaragi et al. | 705/52 |
| 2003/0036947 A1 * | 2/2003 | Smith et al. | 705/10 |
| 2003/0040999 A1 | 2/2003 | Hagan | 705/35 |
| 2003/0046105 A1 | 3/2003 | Elliott | 705/1 |
| 2003/0061064 A1 | 3/2003 | Elliott | 705/1 |
| 2003/0065519 A1 | 4/2003 | Gibson et al. | 705/1 |
| 2003/0065978 A1 | 4/2003 | Adams | 714/38 |
| 2003/0093478 A1 | 5/2003 | Hughes | 709/205 |
| 2003/0097640 A1 | 5/2003 | Abrams et al. | 715/530 |
| 2003/0101197 A1 * | 5/2003 | Sorensen et al. | 707/104.1 |
| 2003/0115217 A1 | 6/2003 | Klug | 707/200 |
| 2003/0115269 A1 | 6/2003 | Klug | 709/205 |
| 2003/0126059 A1 | 7/2003 | Hensley et al. | 705/36 R |
| 2003/0139988 A1 | 7/2003 | Clarkson | 705/35 |
| 2003/0149588 A1 | 8/2003 | Joao | 705/1 |
| 2003/0149681 A1 | 8/2003 | Frees et al. | 707/1 |
| 2003/0220907 A1 * | 11/2003 | Sorensen et al. | 707/3 |
| 2004/0049482 A1 | 3/2004 | Brechter et al. | 707/1 |
| 2004/0073443 A1 * | 4/2004 | Gabrick et al. | 705/1 |
| 2004/0186738 A1 * | 9/2004 | Reisman | 705/1 |
| 2004/0220881 A1 * | 11/2004 | Powell | 705/59 |
| 2005/0086268 A1 * | 4/2005 | Rogers | 707/200 |

FOREIGN PATENT DOCUMENTS

| | | | |
|---|---|---|---|
| JP | 2000-250886 A | | 9/2000 |
| JP | 2001-297203 A | | 10/2001 |
| JP | 2002-083124 A | | 3/2002 |
| JP | 2002092227 | | 3/2002 |
| JP | 2002133114 | | 5/2002 |
| JP | 2002133170 | | 5/2002 |
| JP | 2002157412 | | 5/2002 |
| JP | 2002-230326 A | | 8/2002 |
| JP | 2002-259289 A | * | 9/2002 |
| JP | 2003-085375 A | | 3/2003 |
| JP | 2003-091628 A | | 3/2003 |
| WO | WO 01/35277 A1 | | 5/2001 |
| WO | WO 01/39056 A1 | | 5/2001 |
| WO | WO 01/48664 A1 | | 7/2001 |
| WO | WO 01/77803 | | 10/2001 |
| WO | WO 01/84396 A1 | | 11/2001 |
| WO | WO 02/05150 | | 1/2002 |
| WO | WO 02/15052 | | 2/2002 |
| WO | WO 02/17143 | | 2/2002 |

OTHER PUBLICATIONS

NewIdeaTrade.com "Free Online Service for Buying and Selling New Ideas and Intellectual Property", downloaded from www.newideatrade.com, Nov. 10, 2000.*

Dutt, E. "New Website by Indian Americans for Selling Ideas", India Abroad News Service, Nov. 11, 2000.*

Rhine, J. "Startups Go On Hunt for Bright Ideas", San Francisco Business Times, Dec. 1, 2000.*

Penton Technology Media "GCC Offers Intellectual Property Exchange Forum", iSeries Network, Jan. 8, 2001.*

Prencipe, L.W. "Exchanges Give Bright Ideas Chance to Shine", InfoWorld, vol. 23, No. 9, Feb. 26, 2001, p. 30.*

Brainhead.com "FAQs", downloaded from www.brainhead.com, Apr. 8, 2001.*

Brainhead.com "Protecting Your Ideas", downloaded from www.brainhead.com, Apr. 9, 2001.*

NewIdeaTrade.com "Trading on New Ideas: Free Intellectual Property Exchange Debuts", press release, no later than Apr. 9, 2001.*

Kong, D. "Someplace to Turn When the Light Goes On: Ideas.com Helps Would-Be Inventors Pitch Plans Directly to Companies", Financial Post, Apr. 23, 2001, p. 12.*

BrightIdea.com "Welcome to the World's Most Active Idea Society!", downloaded from www.brightidea.com, May 15, 2001.*

IdeaExchange.com "Company Information", downloaded from www.ideaexchange.com, Jul. 6, 2001.*

Ideas.com "Safely Sell Your Ideas to Top Companies", downloaded from www.ideas.com, Jul. 12, 2001.*

IdeaDollar.com "What Makes a Great Idea", downloaded from www.ideadollar.com, Oct. 17, 2001.*

Armand, N. "Online Trading Forum for Innovators Gets Global Attention", SelfGrowth.com, no later than 2002.*

STAC "Wallace Launches Unique Collaboration to Boost Scotland's Software Industry", press release, Nov. 13, 2003.*

STAC "Empowering Scottish Technology Companies", brochure, STAC 006-01/05.*

Technology, Patents and Licensing, Inc. "Financial and Patent Data Processing System", downloaded from ip.com, Feb. 15, 2001.*

IdeaDollar "Previous Submission Agreement (v1.1)", downloaded from www.ideadollar.com, Mar. 27, 2000.*
IdeaDollar "Submission Agreement (v2.0)", downloaded from www.ideadollar.com, Mar. 14, 2001.*
IdeaDollar "Submit New Idea Page", downloaded from Internet Archive, Jun. 16, 2001.*
Gadikis, H.E. and O. Marina "System and Method for Evaluation of Ideas and Exchange of Value", specification of U.S. Appl. No. 60/226,629, Aug. 21, 2000.*
IdeaExchange "Our Protection Policy", web page, downloaded from www.ideaexchange.com, Jul. 6, 2001.*
IdeaExchange "Member Agreement", web page, downloaded from www.ideaexchange.com, Jul. 10, 2001.*
NewIdeaTrade.com, http://newideatrade.com.
Ideas At The Powerhouse, http://www.ideasatthepowerhouse.com.au.
yet2.com, http://www.yet2.com.
The Patent & License Exchange, Inc. http://www.pl-x.com.
Welcome to PATEX.com http://www.patex.com.
Yes Technologies, http://yestech.com.
Patent Wizard, http://patentwizard.com.
Patent Pro, http://www.4patpro.com.
Scuderi, "Evaluation of 'Patent'", http://www.ipmall.fplc.edu.
Sawhney, "Communities of creation: Managing distributed innovation in turbulent markets", California Management Review, v.42, n.4, pp. 24-54, Summer 2000.
Steinberg, "Money from Nothing—Use the Net to exploit the intangible", Ziff Davis Smart Business for the New Economy, 69, Apr. 1, 2001.
How It Works—CoolLicense.com http://www/coollicense.com.
zPATENTS.com, "Buy and Sell Inventions and Patents! Inventions for Sale & Auction!" http://www.zpatents.com.
HotDispatch http://www.hotdispatch.com.
Infomarkets.com http://www.infomarkets.com.
ebrainx.com http://www.ebrainx.com.
Arzoo—Ask Questions http://www.arzoo.com.
HelloBrain.com http://www.hellobrain.com.
Computer aided innovation (review), Montague Institute Review, http://www.montague.com.
Patent Trademark, and Commercialize your Ideas/Inventions—Harshaw Research, http://harshawresearch.com.
Idea Database http://scienceofinvention.com.
IdeaExchange http://ideaexchange.com.
CyberSolvers http://www.inventors.net.
Welcome to InoNet http://www.inventors.net.
AberdeenGroup, "CollabNet" http://www.aberdeen.com.
AuthentiDate http://www.authentidate.com.
Invention Machine http://www.nimba.com.
Invention Machine Products Page http://www.invention-machine.com.
The Apache Software Foundation http://www.apache.org.
Open Ideas http://www.open-ideas.org.
Submit to GenBank http://www.ncbi.nlm.nih.gov.
BankIt—GenBank Submissions by WWW http://www.ncbi.nlm.nih.gov.
"One-Clicking the Genome" Technology Review, Sep./Oct. 2000, p. 51.
The Cut The Knot Exchange http://www.cut-the-knot.com.
CTK Exchange http://www.cut-the-knot.com.
Synergetic software for collaborating web groups http://www.globalideasbank.org.
Demonstration of the On-Line Encyclopedia of Integer Sequences, Demo 1 and Demo 2, http://www.research.att.com.
"Watertight Imports diversifies services for entrepreneurs" PR Newswire 0302LA006, Mar. 2, 1989.
"Idea generators spark new solutions", Dayton, PC Week, v.8, n.11, p. 109, Mar. 18, 1991.
"The Idea Generator Plus", Pastrick, PC Magazine, v.10, n.8, p. 338, Apr. 30, 1991.
"Dashed Dreams Amateur Inventors Lose Hope . . . " Hemp, Boston Globe, Sep. 17, 1991.
"Eager Inventors Fall Prey To Marketing Scams" Kohn, Pittsburgh Press, Feb. 16, 1992.
"Ten Indicted in $60 Million Invention Promotion Scam, . . . " PR Newswire, p. 2520, May 18, 1999.
"Ringleader and Top Managers of $60 Million Invention Promotion Scam Plead Guilty, . . . " PR Newswire, May 14, 2001.
Freedman, "Ideas for Sale", Inc: The Magazine for Growing Companies, http://www.inc.com/articles/sales/channels/interest-sales/23358.html.
ip.com "no innovation" is too obscure to deserve protection.
Black's Law Dictionary Fifth Edition, West Publishing Co. 1979, pp. 62, 205, 290, 829 and 1195.
Buggie, Frederick D., The Four Phases of Innovation, The Journal of Business Strategy, Boston, Sep./Oct. 2001, vol. 22 Issue 5, p. 36, 7 pages.
Erbisch, et al. "Intellectual Property Rights in Agricultural Biotechnology", CAB International, 1998, pp. 31-39.
Idea Exchange, "Protecting Your Ideas", website www.ideaexchange.com, Aug. 11, 2003.
Manning, et al., "Using groupware software to support collaborative learning in economics", Journal of Economic Education, Washington, Summer 2000, vol. 31, Issue 3, p. 244-252.
MPEP pp. 700-171 and 700-172 of date Aug. 2001.
Takahashi, Creative Software Helps Brainstorming Computers: Twelve years and $4 million in the making, a new program is designed to be a tool for igniting the inventive spark, LA Times, Jul. 12, 1990, p. 9D.
Merriam Webster Online Dictionary, 10th edition, definition of "publishing" retrieved from OneLook.com (http://www.merriam-webster.com/cgi-bin/dictionary?book=Dictionary&va=publish), 1page.
www.garage.com, Welcome to Garage Technology Ventures, Jan. 19, 2001, 2 pages.

* cited by examiner

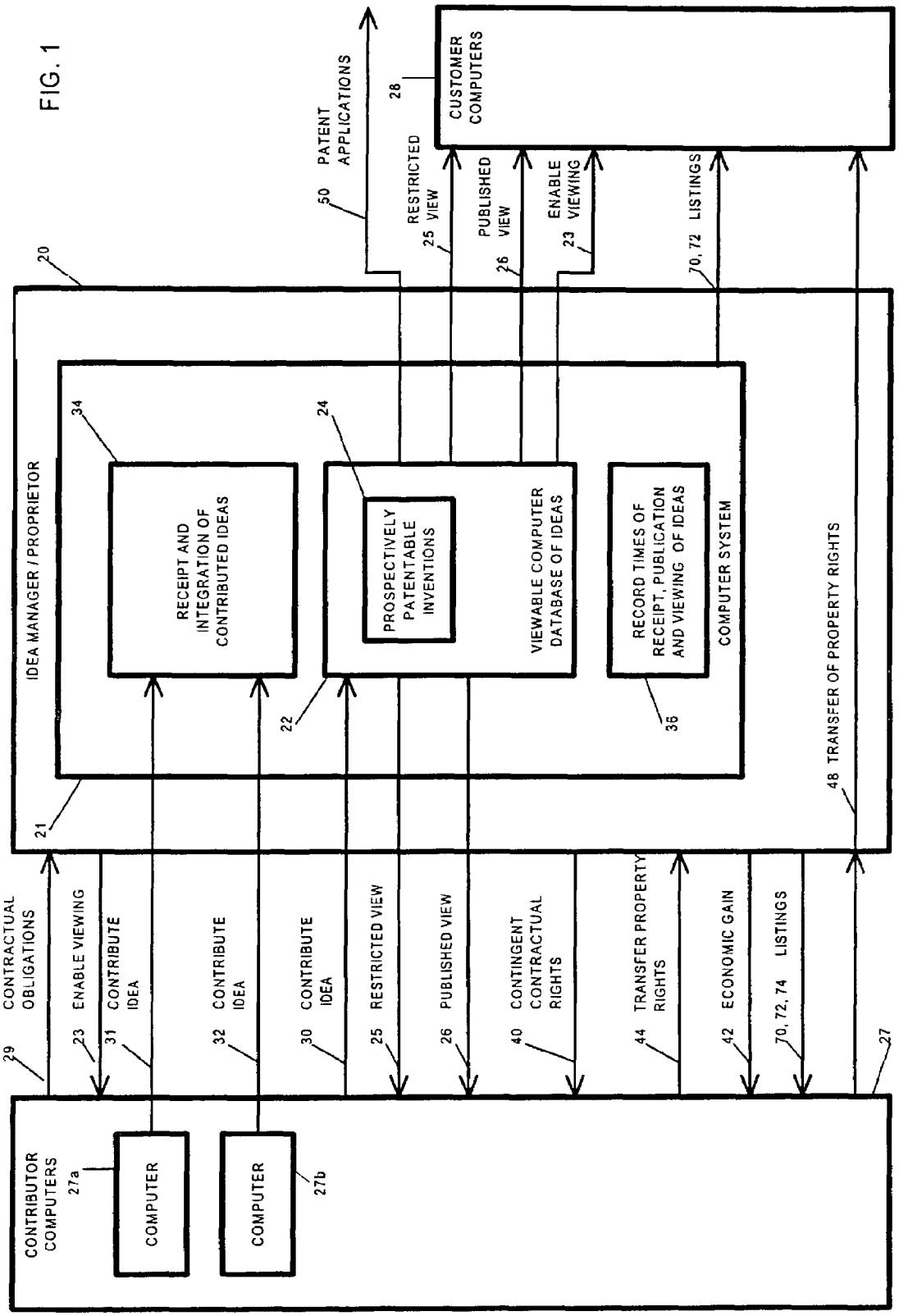

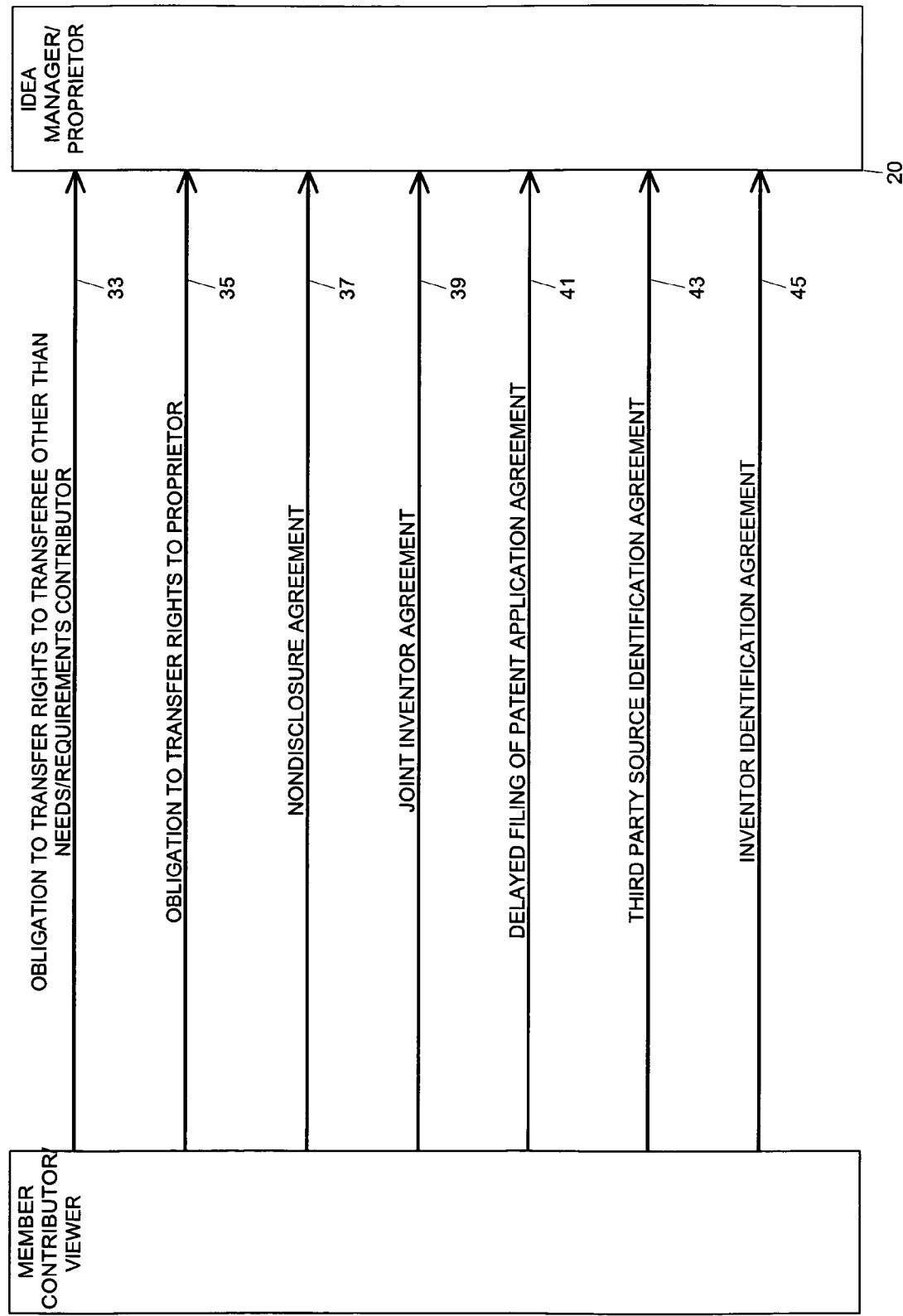

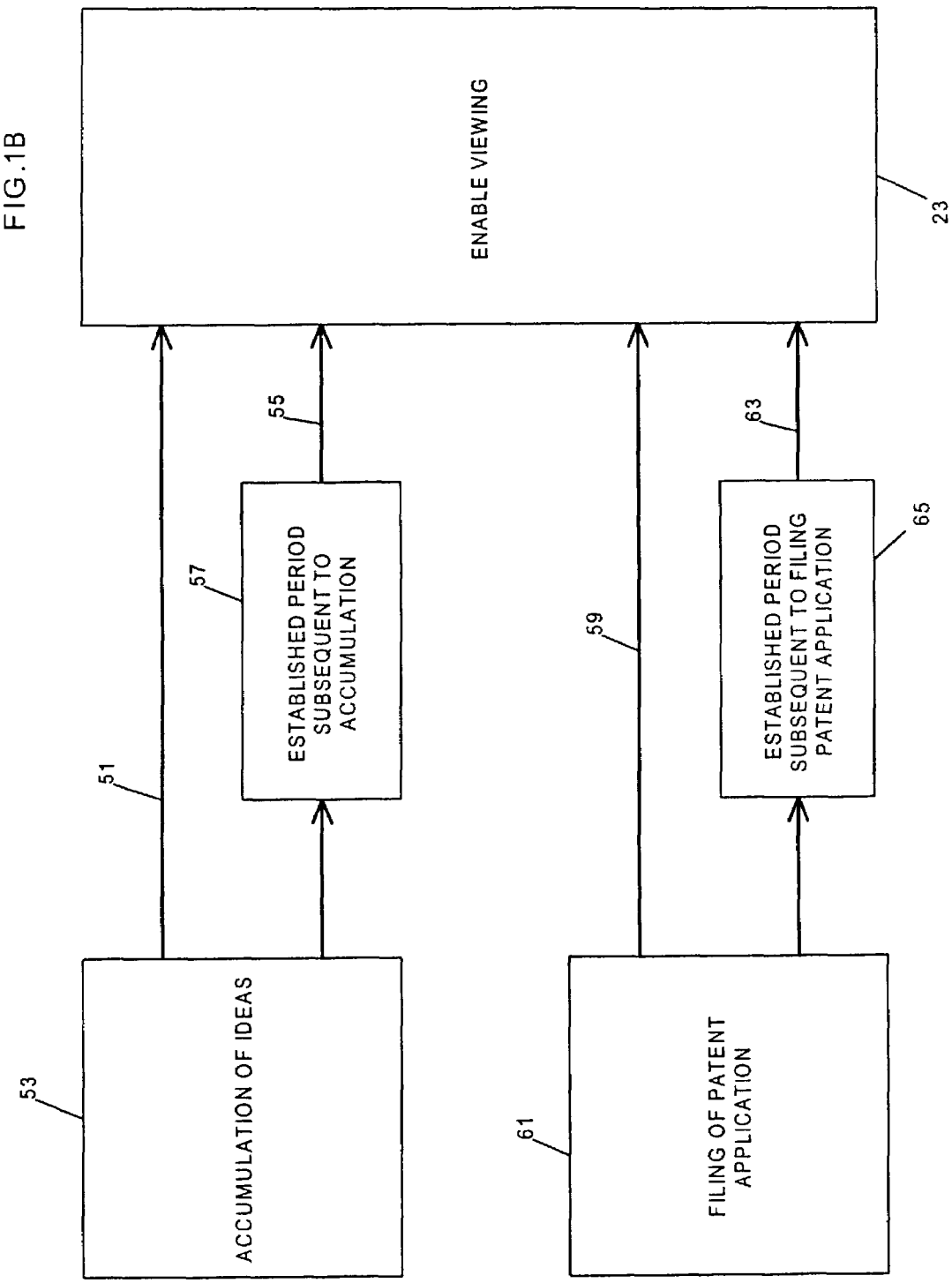

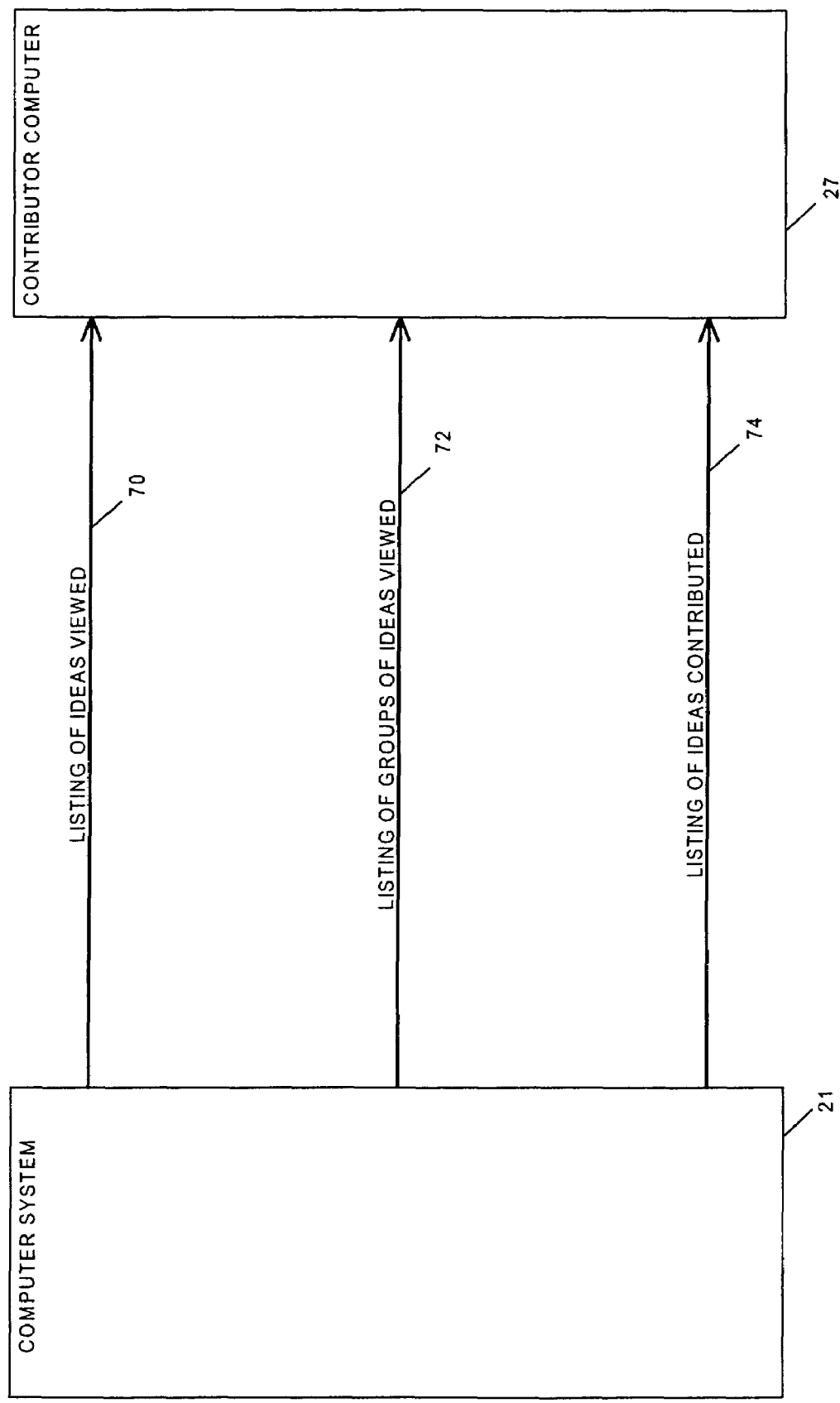

FIG 3

IDEA SPACE ONLINE
A cooperative effort in patent assembly

All About Idea Space

Current User Log-in

Sign Up for a New User Membership

Home         About         Log-in         Sign-up

FIG 4A

About IDEA SPACE

What is Idea Space?
What does Membership entitle?
Where can I learn more about Idea Space?

What is Idea Space?

We use your ideas and ideas from other members to assemble marketable inventions Idea Space is a cutting edge tool for use by inventive minds around the world who would like to share their ideas and watch them become profitable. Likewise Idea Space provides instant access to those who need these creative ideas. We create a win-win environment for everyone.

The net profit from the sale of each invention is shared by all consequential contributors.

What does Membership entitle?

As a member of Idea Space, you will have access to our vast database of pre existing ideas. You have the choice to invent and share your own latest ideas, or browse and build upon the latest ideas contributed by other members.

FIG 4B

FIG 4A

FIG 4B

At Idea Space we carefully watch the developments of our members ideas, and when appropriate we protect your rights by applying for a patent. The net profit from the sale of any patent is shared by all consequential contributors.

As a member you will have the option of staking your claim in these ideas the moment you realize value. Using our powerful search tools you have the opportunity to carefully monitor all ideas developing in your field or fields of interest. Find an idea you can use in your business? Want to make sure your competitors don't get exclusive rights? Bid for them first! Or they will.

Where can I learn more about Idea Space?

Please consult the FAQ (Frequently Asked Questions) Page or follow a link below

How to Participate
Sample Inventions
Examples of Member Profit
About Idea Shares

Home      About      Log-in      Sign-up

FIG 5

Glossary of Terms

Your Ideas
Shared
Consequential Contributors

Your Ideas

Those ideas which you enter into the Idea Space database

Shared contributed for use by a group of people including but not limited to oneself

Consequential Contributors

Those members sharing their ideas deamed essential to the patentability and sellability of the patent tree in question Home   About   Log-in   Sign-up

FIG 6

Member Log-in

| Please log in below | |
|---|---|
| User Name | |
| Password | |

[Log In]

Home  About  Log-in  Sign-up

FIG 7A
Member Sign-up
| Please provide us with the following information | |
|---|---|
| First Name | |
| Last Name | |
| Desired User Name | |
| Password | |
| Re-type Password | |
| Permanent Address | |
| Email Address | |
| Telephone Number | |
| Fax Number | |
| Birthdate | |
| Special Interest | |
FIG 7B

| Other Details | |
|---|---|

Submit

Home    About    Log-in    Sign-up

FIG 8

Acceptance of Service Disclaimer

**AS A CONDITION PRECEDENT FOR
ENABLING DIRECT CONTRIBUTION OF IDEAS
INTO THIS IDEA SPACE WEBSITE, I HEREBY
AGREE THAT THE OWNER OF THIS WEBSITE
IS AUTHORIZED TO BROKER THE TRANSFER
OF ANY INTELLECTUAL RIGHTS DERIVED
FROM ANY DIRECT CONTRIBUTION OF
IDEAS BY ME.**

You must press the button below in order to complete the registration process. Be sure that you have read, understand, and agree to the above binding contract and disclaimer before proceeding.

By pressing this button you agree use of this system is to be governed by the above legally binding contract and disclaimer.

Home  About  Log-in  Sign-up

FIG 9

How to Participate

Participate by finding your niche..

Contribute Needs

Ever wish a product or procedure existed to help you accomplish something? Enter your need and let others attempt solving it

Contribute Solutions

Apply your inventiveness to solve the needs and problems already provided in the Idea Space Database

Contribute Problems

Apply your knowledge in your special interest to correct falacies within the database

Contribute Prior Art

Locate similar ideas existing in the known body of literature and incorporate these references in the idea trees

Breed Ideas

Use our sophisticated tools to help you combine two or more ideas into a new idea, help you brainstorm, or locate the latest areas of development <u>Home</u>     <u>About</u>     <u>Log-in</u>     <u>Sign-up</u>

Examples of Member Profit

Top All Time Profits from Idea Tree Sales
Recent Incomes
Top Individual Earners

Top All Time Profits from Idea Tree Sales

| Tree Name | Patented | Gross Income | Net Profit |
|---|---|---|---|
| A Better Mouse Trap | US1234,567,890 | $100,000,000 | $80,000,000 |
| All Plastic Car | Pending | $64,000,000 | $48,000,900 |
| Leakless Radiator | US1234,567,654<br>US1234,567,655 | $48,000,480 | $36,360,360 |
| Home Cash Dispenser | US1234,567,123<br>JP121,121,212 | $22,000,000 | $14,000,000 |
| Battery Less Fax Machine | Pending | $11,000 | $5,000 |

Recent Incomes

| Tree Name | Patented | Gross Income | Net Profit |
|---|---|---|---|
| Battery Less Fax Machine | Pending | $11,000 | $5,000 |
| Apple Tosser | Pending | $8,900 | $4,900 |
| Super Cooled Fridge | US1234,570,000 | $6,670 | $5,500 |
| Apple Tosser Powered Fax | Pending | $2,100 | $1,000 |
| Reusable Fax Paper | Pending | $500 | $100 |

Top Individual Earners

| Member Name | Number Patents | Number Sales | Net Profit |
|---|---|---|---|
| George Gearless | 16 | 2 | $3,000,000 |
| McGiver | 12 | 11 | $1,400,900 |
| Tom Edison | 32 | 4 | $500,500 |
| Albert Newton | 8 | 2 | $199,000 |
| Inspector Hawkins | 4 | 1 | $99,100 |

Home    About    Log-in    Sign-up

FIG 11

Welcome USER to your Start Page

Publish an Idea

Search for Contributions

Most Active Invention Trees

Trees by Topics

Trees by Bid Value

Your Saved Watch List

Your Idea Space Status

Start Page          Help          Log out

FIG 12            Publish an Idea

Entry Type: Problem

Author: John

Title: Elasticity of Shrink Wrap

Description: Some shrink-wraps would not be suitable because they are not elastic enough for the fit of the circular band aroun the broken frame around the lens.

Previous (0)

Next (0)

References

No References

Categories spectacles
shrink wrap

Connection Link     ( Remove this Link )

Entry Type: Solution

Title: A Suitable Plastic

Description: A suitable plastic can be bought from "Doww Chemicals" and is calle Chemical X.

( Submit Now )    ( Add to Queue )    ( Add Link )

References

Doww Chemicals Fact Sheet ( Add Reference )

Categories spectacles
shrink wrap ( Add Categories )

Start Page        Help        Log out

FIG 13

Search for Contributions

Search by Keywords

Search by Categories

Search by Title Words

Advanced Search

Start Page          Help          Log out

FIG 14

Most Active Invention Trees

| Current Tree Name | Category | Entries | Status |
|---|---|---|---|
| Battery Less Fax Machine | Energy Fax Machine | 972 | Non Exclusive Sale |
| Fudge Fabricator | Machine Food | 99 | In Progress (3 days) |
| Cable Tie Crimper | Plastic Tools Procedures | 42 | In Progress (66 days) |
| Breaking Spectacles | Spectacles | 12 | In Progress (10 min) |

Start Page     Help     Log out

FIG 15

Topics of Invention Trees

| Current Tree Name | Category | Entries | Status |
|---|---|---|---|
| Battery Less Fax Machine | Energy Fax Machine | 972 | Non Exclusive Sale |
| Breaking Spectacles | Spectacles | 12 | In Progress (10 min) |
| Cable Tie Crimper | Plastic Tools Procedures | 42 | In Progress (66 days) |
| Fudge Fabricator | Machine Food | 99 | In Progress (3 days) |
| Paper Products | Paper | 2 | In Progress (92 days) |
| Reading System | Information Procedures | 8 | In Progress (4 hrs 32 min) |

Start Page     Help     Log out

FIG 16

Bid Values on Idea Trees

| Current Tree Name | Category | Bids | Status |
|---|---|---|---|
| Cable Tie Crimper | Plastic Tools Procedures | $1,000,001 | In Progress (66 days) |
| Fudge Fabricator | Machine Food | $499,999 | In Progress (3 days) |
| Reading System | Information Procedures | $89,999 | In Progress (4 hrs 32 min) |
| Battery Less Fax Machine | Energy Fax Machine | $11,000 | Non Exclusive Sale |
| Dream Catcher | Devices | $9,500 | In Progress (92 days) |

Start Page Help Log out

FIG 17

Watch List

| Idea Title | Total Children | New Children | Email Notification | |
|---|---|---|---|---|
| Battery Less Faxer | 972 | 24 | ☐ | [ Browse ] |
| Fudge Fabricator | 99 | 8 | ☐ | [ Browse ] |
| Breaking Spectacles | 8 | 1 | ☑ | [ Browse ] |

Start Page          Help          Log out

FIG 18

Your Idea Space Status

Current Information

| | |
|---|---|
| First Name | Nylon |
| Last Name | Molder |
| User Name | Nylon |
| Permanent Address | 123 flowerpot lane celophane town MI 12312 |
| Email Address | nylon@dowpont.com |
| Telephone Number | 123-456-789 |
| Fax Number | 123-456-788 |
| Birthdate | 23/07/1990 |
| Special Interest | Plastics |
| Other Details | Graduated of Yale |
| Membership Level | Full Membership |
| Email Receipt for Idea Contributions? | Yes |

( Update Profile )

Start Page     Help     Log out

FIG 19A      Browse

Parent Idea(s)

Previous

Parent Type        Title        Rating

No Parent

Move This Parent Down (0)                                                                    (0)

Next

---

Connection Link   [View Details]   Rating: 10x9   Vote [None]

---

Current Idea Selection

Entry Type: Problem or Need

Author: Need-Finder

Title: Breaking Spectacles

Time: August 17, 2000 8:21 PM

Rating: 8x95   Vote [None]

Description: Spectacle frames often break so that a lens will not adhere to the frame and the frame may twist out of shape and not tack on to the head The spectacle user ofte

References

No References

[Add Reference]

Categories

No Categories

[Add Category]

Previous (0)                                                   Next (0)

[Submit a Solution]   [View Details]   [Add Connecting Link]   [Add to Watch List]

---

Connection Link   [View Details]   Rating: 10x75   Vote [None]

FIG 19B          FIG 19A
Child Idea(s)
( Move This Child Up )
Entry Type: Solution
Rating: 6x82          Vote None 
Title: Use Shrink Wrap Tubes
Description: I have access to the "Co-Brain" software
which suggests the alternative "fasten with
shrink-wrap" to "fasten with glue". Maybe
Previous (0)          Next (2)

Child Idea(s)

Move This Child Up

Entry Type: Solution
Rating: 4x87     Vote None 
Title: Use Glue
Description: Glue the frame to the glass and buy new spectacles.

Previous (1)

Next (1)

FIG 21A                          Browse

Parent Idea(s)

Previous

Parent Type        Title          Rating

No Parent

( Move This Parent Down )

(0)                                                    Next  (0)

---

Connection Link   ( View Details )    Rating: 10    Vote [None ▼]

---

Current Idea Selection

Entry Type: Problem or Need           References

Author: Need-Finder                    [No References]

Title: Breaking Spectacles

Time: August 17, 2000 8:21 PM

Previous

Rating: 8x95   Vote [None ▼]        ( Add Reference )    Next

Description: Spectacle frames often      Categories         (0)
break so that a lens
(0)                  will not adhere to the
frame and the frame may            [No Categories]
twist out of shape and
not tack on to the head
The spectacle user ofte ( Add Category )

( Submit a Solution )  ( View Details )  ( Add Connecting Link )  ( Add to Watch List )

---

Connection Link   ( View Details )    Rating: 10x99   Vote [None ▼]

Child Idea(s)

Move This Child Up

Entry Type: Solution

Rating: 2x90  Vote None

Title: Use Glue

Description: Glue the frame together with super glue.

Previous (2)

Next (0)

FIG 22A                Browse

Parent Idea(s)

| | Parent Type | Title | Rating | |
|---|---|---|---|---|
| Previous | Problem or Need | Breaking Spectacles | 8x95 | Next |

[ Move This Parent Down ]

(1)                                                                                                             (0)

Connection Link    [ View Details ]    Rating: 10x75    Vote [None]

Current Idea Selection

Entry Type: Solution            References

Author: Solutions-Galore        [ No References ]

Title: Use Shrink Wrap Tubes

Time: August 17, 2000 8:26 PM

Rating: 6x82    Vote [None]    [ Add Reference ]

Description:
```
I have access to the "Co-
Brain" software which
suggests the
alternative "fasten with
shrink-wrap" to "fasten
with glue". Maybe you
could have a small tube
```

Categories

[ No Categories ]

(0)    [ Prospector Information ]    [ Marketing Options ]      [ Add Category ]

[ Submit a Solution ]   [ View Details ]   [ Add Connecting Link ]   [ Add to Watch List ]

Connection Link    [ View Details ]    Rating: 10x74    Vote [None]

Child Idea(s)

( Move This Child Up )

Entry Type: Problem or Need

Rating: 9x71        Vote None

Title: Tubes Don't Fit

Description: The soda straw solution will only work for some lucky cases. Most often the spectacle frame breaks near the arch or the ear Previous (0)

Next (1)

FIG 23A          Browse

Parent Idea(s)

| Parent Type | Title | Rating |
|---|---|---|
| Problem or Need | Breaking Spectacles | 8x95 |

[Previous] (1)    [Move This Parent Down]    [Next] (0)

---

Connection Link    [View Details]    Rating: 10x75    Vote [None ▼]

---

Current Idea Selection

Entry Type: Solution          References

Author: Solutions-Galore

Title: Use Shrink Wrap Tubes    *No References*

Time: August 17, 2000 8:26 PM

Rating: 6x82   Vote [None ▼]    [Add Reference]

Description: 
```
I have access to the "C
Brain" software which
suggests the
alternative "fasten wit
shrink-wrap" to "fasten
with glue". Maybe you
could have a small tube
```

Categories

*No Categories*

[Add Category]

[Previous] (0)    [Next] (0)

[Submit a Solution]   [View Details]   [Add Connecting Link]   [Add to Watch List]

---

Connection Link    [View Details]    Rating: 6x70    Vote [None ▼]

Child Idea(s)

( Move This Child Up )

Entry Type: Problem or Need

Rating: 7x45    Vote None

Title: Lacks Appeal

Description: The color of the shrink-wrap could in some cases look very ugly.

Previous (1)

Next (0)

FIG 24A            Browse

Parent Idea(s)

| Previous | Parent Type | Title | Rating | Next |
|---|---|---|---|---|
| | Solution | Use Shrink Wrap Tubes | 6x82 | |

( Move This Parent Down )

(0)                                                                    (0)

---

Connection Link  ( View Details )   Rating: 10x74   Vote [None ▼]

---

Current Idea Selection

Entry Type: Problem or Need                References

Author: Tom
                                                                 [No References]
Title: Tubes Don't Fit

Time: August 17, 2000 8:27 PM

Rating: 9x71   Vote [None ▼]      ( Add Reference )

Description: 
```
The soda straw solution
will only work for some
lucky cases. Most often
the spectacle frame
breaks near the arch or
the ear attachment and
the soda straw solution
```

Categories

(0)                                                                    (0)

[No Categories]

( Add Category )

( Submit a Solution ) ( View Details ) ( Add Connecting Link ) ( Add to Watch List )

---

Connection Link  ( View Details )   Rating: 10x61   Vote [None ▼]

```
                          Child Idea(s)

( Move This Child Up )

Entry Type: Solution
       Rating: 9x71           Vote  None ▼
        Title: Shrink Wrap Entire Frame
  Description: (1). Make a larger tube of shrink wrap with
               diameter about the size of the frame around
               the lens,       (2) Cut a thin sliver from
```

Previous (0)    Next (0)

FIG 25A            Browse

Parent Idea(s)

| Previous | Parent Type | Title | Rating | Next |
|---|---|---|---|---|
| | Problem or Need | Tubes Don't Fit | 9x71 | |

Move This Parent Down (0)          (0)

---

Connection Link    [View Details]    Rating: 10x61    Vote [None ▼]

---

Current Idea Selection

Entry Type: Solution        References

Author: Tom        No References

Title: Shrink Wrap Entire Frame

Time: August 17, 2000 8:28 PM

Rating: 9x71    Vote [None ▼]    [Add Reference]

Description:
```
(1) Make a larger tube
of shrink wrap with a
diameter about the size
of the frame around the
lens,   (2) Cut a thin
sliver from the end of
the tube with scissors
```

Categories

No Categories

[Add Category]

Previous (0)      Next (0)

[Submit a Solution]   [View Details]   [Add Connecting Link]   [Add to Watch List]

---

Connection Link    [View Details]    Rating: 10x55    Vote [None ▼]

FIG 25B  FIG 25A
Child Idea(s)
( Move This Child Up )
Entry Type: Solution
Rating: 8x42   Vote None 
Title: Unsuitable Plastic
Description: Some shrink-wraps would not be suitable because they are not elastic enough for the fit of the circular band around the broken
Previous (0)
Next (1)

FIG 26A            Browse

Parent Idea(s)

| | Parent Type | Title | Rating | |
|---|---|---|---|---|
| Previous | Problem or Need | Tubes Don't Fit | 9x71 | Next |

( Move This Parent Down )

(0)                                                  (0)

Connection Link ( View Details )    Rating: 10x61    Vote [None ▼]

Current Idea Selection

Entry Type: Solution            References

Author: Tom                     No References

Title: Shrink Wrap Entire Frame

Time: August 17, 2000 8:28 PM

Rating: 9x71    Vote [None ▼]      ( Add Reference )

Description: (1) Make a larger tube of shrink wrap with a diameter about the size of the frame around the lens, (2) Cut a thin sliver from the end of the tube with scissors

Categories

No Categories ( Add Category )

( Submit a Solution )   ( View Details )   ( Add Connecting Link )   ( Add to Watch List )

Connection Link ( View Details )    Rating: 10x56    Vote [None ▼]

Child Idea(s)

( Move This Child Up )

Entry Type: Problem

Rating: 7x45  Vote None

Title: Lacks Appeal

Description: The color of the shrink-wrap could in some cases look very ugly.

(1)  (0)

Previous  Next

FIG 27A  Browse

Parent Idea(s)

| Parent Type | Title | Rating |
|---|---|---|
| Solution | Shrink Wrap Entire Frame | 9x71 |

Move This Parent Down

Previous (0)   Next (1)

---

Connection Link  View Details   Rating: 10x55   Vote [None]

---

Current Idea Selection

Entry Type: Problem or Need
Author: John
Title: Unsuitable Plastic
Time: August 17, 2000 8:31 PM
Rating: 8x42   Vote [None]
Description: Some shrink-wraps would not be suitable because they are not elastic enough for the fit of the circular band aroun the broken frame around the lens

References
No References

Add Reference

Categories
Spectacle
Shrink Wrap
Plastic

Add Category

Previous (0)   Next (1)

Submit a Solution | View Details | Add Connecting Link | Add to Watch List

---

Connection Link  View Details   Rating: 10x50   Vote [None]

↓
FIG 27B

FIG 27B　　　　　　　FIG 27A
Child Idea(s)
Move This Child Up
Entry Type: Solution
Rating: 8x43　　　　Vote None 
Title: Suitable Plastic
Description: A suitable plastic can be bought from "Doww Chemicals" and is called Chemical X.
Previous (0)　　　　Next (0)

FIG 28A  Browse

Parent Idea(s)

Previous (0)

| Parent Type | Title | Rating |
|---|---|---|
| Problem or Need | Unsuitable Plastic | 7x9 |

Move This Parent Down

Next (0)

---

Connection Link  [View Details]   Rating: 10x50   Vote [None ▼]

---

Current Idea Selection

Previous (0)

Entry Type: Solution
Author: John
Title: Suitable Plastic
Time: August 17, 2000 8:32 PM
Rating: 8x43   Vote [None ▼]
Description: A suitable plastic can be bought from "Doww Chemicals" and is calle Chemical X.

References

Doww Plastic Facts

[Add Reference]

Categories

Spectacle
Shrink Wrap
Plastic

[Add Category]

Next (0)

[Submit a Solution]  [View Details]  [Add Connecting Link]  [Add to Watch List]

---

Connection Link  [View Details]   Rating:   Vote [None ▼]

↓
FIG 28B

Child Idea(s)

Move This Child Up

Entry Type: None Available

Rating: Vote None

Title:

Description:

Previous (0)

Next (0)

FIG 29A  Browse

Parent Idea(s)

| Parent Type | Title | Rating |
|---|---|---|
| Solution | Shrink Wrap Entire Frame | 9x71 |

Previous (0)    Move This Parent Down    Next (1)

---

Connection Link  [View Details]   Rating: 10x56   Vote [None]

---

Current Idea Selection

Entry Type: Problem or Need
Author: Rhonda
Title: Lacks Appeal
Time: August 17, 2000 8:29 PM
Rating: 7x45   Vote [None]
Description: The color of the shrink wrap could in some case look very ugly.

References
No References

[Add Reference]

Categories
No Categories

[Add Category]

Previous (1)    Next (0)

[Submit a Solution]  [View Details]  [Add Connecting Link]  [Add to Watch List]

---

Connection Link  [View Details]   Rating: 10x44   Vote [None]

↓
FIG 29B

FIG 29B FIG 29A

FIG 30A          Browse

Parent Idea(s)

Previous

| Parent Type | Title | Rating | Next |
|---|---|---|---|
| Solution | Use Shrinkwrap Tubes | 6x82 | |

( Move This Parent Down )

(1)                    (0)

---

Connection Link  ( View Details )    Rating: 6x70    Vote [None ▼]

---

Current Idea Selection

Entry Type: Problem or Need                References

Author: Rhonda

Title: Lacks Appeal                        | No References |

Time: August 17, 2000 8:29 PM

Previous

Rating: 7x45    Vote [None ▼]         ( Add Reference )     Next

Description: The color of the shrink       Categories
wrap could in some case
look very ugly.                                                                (0)

(1)                                             | No Categories |

( Add Category )

( Submit a Solution )  ( View Details )  ( Add Connecting Link )  ( Add to Watch List )

---

Connection Link  ( View Details )    Rating: 10x44    Vote [None ▼]

Child Idea(s)

( Move This Child Up )

Entry Type: Solution

Rating: 8x44   Vote None

Title: Clear Choice

Description: The shrink-wrap should be transparent.

Previous (0)

Next (0)

FIG 31A                  Browse

Parent Idea(s)

| Previous | Parent Type | Title | Rating | Next |
|---|---|---|---|---|
| | Problem or Need | Lacks Appeal | 7x45 | |

( Move This Parent Down )

(0)                                                                                                      (0)

---

Connection Link    ( View Details )     Rating: 10x44     Vote [None]

---

Current Idea Selection

Entry Type: Solution                References

Author: Rhonda

Title: Clear Choice                [No References]

Time: August 17, 2000 8:30 PM

Rating: 8x44   Vote [None]

Description: [The shrink-wrap should be transparent]

Previous (0)                                           ( Add Reference )    Next (0)

Categories

[No Categories]

( Add Category )

( Submit a Solution )   ( View Details )   ( Add Connecting Link )   ( Add to Watch List )

---

Connection Link    ( View Details )     Rating: 0x31     Vote [None]

Child Idea(s)

( Move This Child Up )

Entry Type: Problem or Need

Rating: 8x42  Vote None

Title: Unsuitable Plastic

Description: Some shrink-wraps would not be suitable because they are not elastic enough for the fit of the circular band around the broken Previous (0)

Next (0)

FIG 32A           Browse

Parent Idea(s)

| | Parent Type | Title | Rating | |
|---|---|---|---|---|
| Previous | Solution | Clear Choice | 8x44 | Next |

Move This Parent Down (1)          (0)

---

Connection Link   [View Details]   Rating: 0x31   Vote [None ▼]

---

Current Idea Selection

Entry Type: Problem or Need      References

Author: John

Title: Unsuitable Plastic      No References

Time: August 17, 2000 8:31 PM

Rating: 8x42    Vote [None ▼]    [Add Reference]

Description: Some shrink-wraps would not be suitable because they are not elastic enough for the fit of the circular band aroun the broken frame around the lens Previous (0)      Next (0)

Categories

Spectacle
Shrink Wrap
Plastic

[Add Category]

[Submit a Solution]   [View Details]   [Add Connecting Link]   [Add to Watch List]

---

Connection Link   [View Details]   Rating: 10x50   Vote [None ▼]

FIG 32B         FIG 32A
Child Idea(s)
( Move This Child Up )
Entry Type: Solution
Rating: 8x43   Vote None 
Title: Suitable Plastic
Description: A suitable plastic can be bought from "Doww Chemicals" and is called Chemical X.
Previous (0)
Next (0)

FIG 33A Browse

Parent Idea(s)

| | Parent Type | Title | Rating | |
|---|---|---|---|---|
| Previous | Problem or Need | Breaking Spectacles | 8x95 | Next |

[Move This Parent Down]

(0) (0)

---

Connection Link [View Details] Rating: 10x90 Vote [None]

---

Current Idea Selection

Entry Type: Solution

Author: Rhonda

Title: Use Glue

Time: August 17, 2000 8:23 PM

Rating: 4x87 Vote [None]

Description: Glue the frame to the glass and buy new spectacles.

References

No References

[Add Reference]

Categories

No Categories

[Add Category]

Previous (1) Next (0)

[Submit a Solution] [View Details] [Add Connecting Link] [Add to Watch List]

---

Connection Link [View Details] Rating: 10x65 Vote [None]

Child Idea(s)

( Move This Child Up )

Entry Type: Solution

Rating: 6x65      Vote None

Title: Glue Doesn't Work

Description: I have tried gluing with all kinds of glue but nothing has worked.

Previous (0)

Next (1)

FIG 34A             Browse

Parent Idea(s)

| | Parent Type | Title | Rating | |
|---|---|---|---|---|
| Previous | Solution | Use Glue | 4x87 | Next |

Move This Parent Down (0)                                                              (1)

---

Connection Link    [View Details]    Rating: 10x65    Vote [None ▼]

---

Current Idea Selection

Entry Type: Problem or Need        References

Author: Need-Finder

Title: Glue Doesn't Work        [No References]

Time: August 17, 2000 8:24 PM

Rating: 6x65    Vote [None ▼]     [Add Reference]

Description: I have tried gluing wit all kinds of glue but nothing has worked.

Categories

[No Categories]

[Add Category]

[Submit a Solution]   [View Details]   [Add Connecting Link]   [Add to Watch List]

Previous (0)            Next (1)

---

Connection Link    [View Details]    Rating:    Vote [None ▼]

FIG 34B　　　　　　　　FIG 34A
　　　　　　　　　　　　　　↑
Child Idea(s)
( Move This Child Up )
Entry Type: None Available
Rating: Vote None 
Title: [_____]
Description: [_____]
Previous (0)　　　　　　　　　　　　　　　　Next (0)

FIG 35A          Browse

Parent Idea(s)

| | Parent Type | Title | Rating | |
|---|---|---|---|---|
| Previous | Problem or Need | Breaking Spectacles | 8x95 | Next |

Move This Parent Down (0)        (0)

---

Connection Link    View Details    Rating: 10x90    Vote [None ▼]

---

Current Idea Selection

Entry Type: Solution        References

Author: Rhonda

Title: Use Glue       [No References]

Time: August 17, 2000 8:23 PM

Rating: 4x87    Vote [None ▼]    ( Add Reference )

Description: Glue the frame to the glass and buy new spectacles.      Categories

Previous (1)        [No Categories]      Next (1)

( Add Category )

( Submit a Solution ) ( View Details ) ( Add Connecting Link ) ( Add to Watch List )

---

Connection Link    View Details    Rating: 8x89    Vote [None ▼]

Child Idea(s)

Move This Child Up

Entry Type: Solution

Rating: 8x75　　　Vote None

Title: Glue Doesn't Work

Description: I have access to the "Co-Brain" software which suggests the alternative "fasten with shrink-wrap" to "fasten with glue". Maybe Previous (1)　　　Next (0)

FIG 36A       Browse

Parent Idea(s)

| | Parent Type | Title | Rating | |
|---|---|---|---|---|
| Previous | Solution | Use Glue | 4x87 | Next |

[Move This Parent Down]

(0)       (1)

---

Connection Link  [View Details]   Rating: 8x89   Vote [None]

---

Current Idea Selection

Entry Type: Problem or Need

Author: Tom

Title: Glue Doesn't Work

Time: August 17, 2000 8:25 PM

Rating: 8x75    Vote [None]

Description: Spectacle frames are made of glass and all kinds of plastics and all kinds of metals, it is not likely that any glue can be made which will glue all of these

References

Fix It Yourself

[Add Reference]

Categories

No Categories

[Add Category]

Previous (1)    Next (0)

[Submit a Solution]  [View Details]  [Add Connecting Link]  [Add to Watch List]

---

Connection Link  [View Details]   Rating: 10x72   Vote [None]

↓
FIG 36B

FIG 36A
FIG 36B
Child Idea(s)
Move This Child Up
Entry Type: Solution
Rating: 6x82    Vote None 
Title: Use Shrink Wrap tubes
Description: I have access to the "Co-Brain" software which suggests the alternative "fasten with shrink-wrap" to "fasten with glue". Maybe 
Previous (0)
Next (0)

FIG 37A  Browse

Parent Idea(s)

| Parent Type | Title | Rating |
|---|---|---|
| Problem or Need | Glue Doesn't Work | 8x75 |

Previous (0)  [ Move This Parent Down ]  Next (1)

---

Connection Link  [ View Details ]   Rating: 10x72   Vote [None ▼]

---

Current Idea Selection

Entry Type: Solution
Author: Solutions-Galore
Title: Use Shrink Wrap Tubes
Time: August 17, 2000 8:26 PM
Rating: 6x82   Vote [None ▼]
Description: I have access to the "C Brain" software which suggests the alternative "fasten wit shrink-wrap" to "fasten with glue". Maybe you could have a small tube Previous (0)   Next (0)

References
No References

[ Add Reference ]

Categories
No Categories

[ Add Category ]

[ Submit a Solution ]  [ View Details ]  [ Add Connecting Link ]  [ Add to Watch List ]

---

Connection Link  [ View Details ]   Rating: 10x74   Vote [None ▼]

Child Idea(s)

( Move This Child Up )

Entry Type: Problem or Need

Rating: 9x71          Vote None

Title: Tubes Don't Fit

Description: The soda straw solution will only work for some lucky cases. Most often the spectacle frame breaks near the arch or the ear Previous (0)

Next (1)

FIG 38A          Browse

Parent Idea(s)

| Parent Type | Title | Rating |
|---|---|---|
| Problem or Need | Glue Doesn't Work | 8x75 |

Previous (0)    [ Move This Parent Down ]    Next (1)

---

Connection Link    [ View Details ]    Rating: 10x72    Vote [None ▾]

---

Current Idea Selection

Entry Type: Solution
Author: Solutions-Galore
Title: Use Shrink Wrap Tubes
Time: August 17, 2000 8:26 PM
Rating: 6x82    Vote [None ▾]
Description:
```
I have access to the "C
Brain" software which
suggests the
alternative "fasten wit
shrink-wrap" to "fasten
with glue". Maybe you
could have a small tube
```

References

[ No References ]

[ Add Reference ]

Categories

[ No Categories ]

[ Add Category ]

Previous (0)    Next (0)

[ Submit a Solution ]   [ View Details ]   [ Add Connecting Link ]   [ Add to Watch List ]

---

Connection Link    [ View Details ]    Rating: 6x70    Vote [None ▾]

Child Idea(s)

Move This Child Up

Entry Type: Problem or Need

Rating: 7x45  Vote None

Title: Lacks Appeal

Description: The color of the shrink-wrap could in some cases look very ugly.

(1)  Previous  Next  (0)

FIG 39A  Browse

Parent Idea(s)

| Parent Type | Title | Rating |
|---|---|---|
| Problem or Need | Breaking Spectacles | 8x95 |

[Previous] (0)   [Move This Parent Down]   [Next] (0)

---

Connection Link   [View Details]   Rating: 10x99   Vote [None]

---

Current Idea Selection

Entry Type: Solution
Author: Solutions-Galore
Title: Use Glue
Time: August 17, 2000 8:22 PM
Rating: 2x90   Vote [None]
Description: Glue the frame together with super glue.

References
No References

[Add Reference]

Categories
No Categories

[Add Category]

[Previous] (0)   [Next] (0)

[Submit a Solution]   [View Details]   [Add Connecting Link]   [Add to Watch List]

---

Connection Link   [View Details]   Rating: 10x92   Vote [None]

Child Idea(s)

( Move This Child Up )

Entry Type: Problem or Need

Rating: 6x65    Vote [None ▼]

Title: [Glue Doesn't work]

Description: [I have tried gluing with all kinds of glue but nothing has worked.]

Previous (0)

Next (1)

FIG 40A          Browse

Parent Idea(s)

| Previous | Parent Type | Title | Rating | Next |
|---|---|---|---|---|
| | Solution | Use Glue | 2x90 | |

Move This Parent Down (1)          (0)

---

Connection Link    ( View Details )    Rating: 10x92    Vote [None ▼]

---

Current Idea Selection

References

Entry Type: Problem or Need
Author: Need-Finder
Title: Glue Doesn't Work
Time: August 17, 2000 8:24 PM
Rating: 6x65    Vote [None ▼]
Description: I have tried gluing wit all kinds of glue but nothing has worked.

No References ( Add Reference )

Categories

No Categories ( Add Category )

( Submit a Solution )   ( View Details )   ( Add Connecting Link )   ( Add to Watch List )

(0)          (1)

---

Connection Link    ( View Details )    Rating:    Vote [None ▼]

Child Idea(s)

( Move This Child Up )

Entry Type: None Available

Rating: Vote None

Title:

Description:

Previous (0)

Next (0)

FIG 41A  Browse

Parent Idea(s)

| Parent Type | Title | Rating |
|---|---|---|
| Problem or Need | Breaking Spectacles | 8x95 |

Previous (0)   Next (0)

[ Move This Parent Down ]

---

Connection Link  [ View Details ]   Rating: 10x99   Vote [None ▼]

---

Current Idea Selection

Entry Type: Solution
Author: Solutions-Galore
Title: Use Glue
Time: August 17, 2000 8:22 PM
Rating: 2x90   Vote [None ▼]
Description: Glue the frame together with super glue.

References
No References

[ Add Reference ]

Categories
No Categories

[ Add Category ]

Previous (0)   Next (0)

[ Submit a Solution ]  [ View Details ]  [ Add Connecting Link ]  [ Add to Watch List ]

---

Connection Link  [ View Details ]   Rating: 8x86   Vote [None ▼]

Child Idea(s)

( Move This Child Up )

Entry Type: Problem or Need

Rating: 8x75    Vote None

Title: Glue Doesn't work

Description: Spectacle frames are made of glass and all kinds of plastics and all kinds of metals, it is not likely that any glue can be made Previous (1)

Next (0)

FIG 42A          Browse

Parent Idea(s)

| | Parent Type | Title | Rating | |
|---|---|---|---|---|
| Previous (1) | Solution | Use Glue | 2x90 | Next (0) |

Move This Parent Down

---

Connection Link [View Details]    Rating: 8x86    Vote [None ▼]

---

Current Idea Selection

Entry Type: Problem or Need      References

Author: Tom

Title: Glue Doesn't Work      [Fix It Yourself]

Time: August 17, 2000 8:25 PM

Rating: 8x75    Vote [None ▼]    [Add Reference]

Description: Spectacle frames are made of glass and all kinds of plastics and all kinds of metals, it is not likely that any glue can be made which will glue all of these

Categories

No Categories

[Add Category]

Previous (1)      Next (0)

[Submit a Solution] [View Details] [Add Connecting Link] [Add to Watch List]

---

Connection Link [View Details]    Rating: 10x72    Vote [None ▼]

Child Idea(s)

( Move This Child Up )

Entry Type: Solution

Rating: 6x82  Vote [None ▼]

Title: Use Shrink Wrap tubes

Description: I have access to the "Co-Brain" software which suggests the alternative "fasten with shrink-wrap" to "fasten with glue". Maybe Previous (0)

Next (0)

FIG 43                                    View Details

```
Contributing Author: Need-Finder
         Entry Type: Problem
              Title: Breaking Spectacles
         Bid Status: No Bid
    Submission Time: August 17, 2000 8:21 PM + .2171 Min
   Publication Time: August 17, 2000 8:21 PM + .3143 Min
             Rating: 8
          My Rating: None
    Number of Votes: 95
   Number of Visits: 192
```

Description: Spectacle frames often break so that a lens will not adhere to the frame and the frame may twist out of shape and not tack on to the head The spectacle user ofte 

Categories: No Categories

References: No References

Number of Parents: 1
Number of Children: 3
Number of Siblings: 0

Return

Connection Link Details

| | |
|---:|:---|
| Contributing Author: | Need-Finder |
| Entry Type: | Connection Link |
| Title of Linked Problem: | Broken Spectacles |
| Title of Linked Solution: | Use Shrink Wrap Tubes |
| Bid Status: | No Bid |
| Submission Time: | August 17, 2000 8:26 PM + .2171 Min |
| Publication Time: | August 17, 2000 8:28 PM + .3143 Min |
| Rating: | 10 |
| My Rating: | None |
| Number of Votes: | 75 |
| Number of Visits: | 155 |

FIG 45

Add Reference

Enter Reference Information:               [                    ]
                    ( Submit )  ( Internal Reference )

FIG 46A           Add Reference

| Previous | Parent Type | Title | Rating | Next |
|---|---|---|---|---|
| (0) | No Parent [Move This Parent Down] | | | (0) |

Connection Link [View Details]     Rating: 10x9     Vote [None ▼]

Current Idea Selection

Entry Type: Problem or Need
Author: Need-Finder
Title: Breaking Spectacles
Time: August 17, 2000 8:21 PM
Rating: 7x5 8x95  Vote [None ▼]
Description:
```
Spectacle frames often
break so that a lens
will not adhere to the
frame and the frame may
twist out of shape and
not tack on to the head
The spectacle user ofte
```

References
[No References]

Categories (0)
[No Categories]

Previous (0)     Next

[View Details]       [Add this as the Reference]

Connection Link [View Details]     Rating: 10x75     Vote [None ▼]

Child Idea(s)

Move This Child Up

Entry Type: Solution

Rating: 6x82    Vote [None ]

Title: Use Shrink Wrap Tubes

Description: I have access to the "Co-Brain" software which suggests the alternative "fasten with shrink-wrap" to "fasten with glue". Maybe Previous (0)

Next (2)

FIG 47A  Add Link

| Previous | Parent Type | Title | Rating | Next |
|---|---|---|---|---|
| (0) | No Parent <br> [Move This Parent Down] | | | (0) |

Connection Link  [View Details]   Rating: 10x9   Vote [None ▼]

---

Current Idea Selection

Entry Type: Problem or Need
Author: Need-Finder
Title: Breaking Spectacles
Time: August 17, 2000 8:21 PM
Rating: 8x95   Vote [None ▼]
Description: Spectacle frames often break so that a lens will not adhere to the frame and the frame may twist out of shape and not tack on to the head The spectacle user ofte

References
No References

Categories   (0)
No Categories

Previous (0)   Next

[View Details]         [Create the Link Here]

---

Connection Link  [View Details]   Rating: 10x75   Vote [None ▼]

Child Idea(s)

( Move This Child Up )

Entry Type: Solution

Rating: 6x82   Vote [None ▼]

Title: [Use Shrink Wrap Tubes]

Description: I have access to the "Co-Brain" software which suggests the alternative "fasten with shrink-wrap" to "fasten with glue". Maybe Previous (0)

Next (2)

FIG 48

Search by Keyword

| Enter Keywords to search for | spectacle & glue |
| | [ Search ] |

Start Page  Help  Log out

FIG 49

Search by Keyword

| Enter Keywords to search for | spectacle & glue |
|---|---|
| | Next Search |

Search Results

| Title | Type | Context |
|---|---|---|
| Use Glue | Solution | "Glue the frame together with super glue". |
| Use Glue | Solution | "Glue the frame to the glass and buy.." |
| Glue Doesn't Work | Problem | "..not likely that any glue can be made.."<br>"..made which will glue all of these.." |
| Glue Doesn't Work | Problem | "..to 'fasten with glue'. Maybe you.." |

Start Page     Help     Log out

FIG 50

Search by Category

| Enter categories to search for | spectacle & plastic |
|---|---|
| | Search |

Start Page   Help   Log out

FIG 51

Search by Category

| Enter Categories to search for | spectacle & plastic |
|---|---|
| | Next Search |

Search Results

| Title | Type | Categories |
|---|---|---|
| Unsuitable Plastic | Problem | Spectacle; Shrink Wrap; Plastic |
| Suitable Plastic | Solution | Spectacle; Shrink Wrap; Plastic |

Start Page     Help     Log out

FIG 52

Search by Title Words

| Enter Keywords to search for | glue - work |

Search

Start Page　　　Help　　　Log out

FIG 53

Search by Title Words

| Enter Keywords to search for | glue - work |
|---|---|

Next Search

Search Results

| Title | Type | Context |
|---|---|---|
| Use Glue | Solution | "Glue the frame together with super glue." |
| Use Glue | Solution | "Glue the frame to the glass and buy.." |

Start Page     Help     Log out

FIG 54

Your Idea Space Status

Update Information

| | |
|---|---|
| First Name | Nylon |
| Last Name | Molder |
| User Name | Plastic Man |
| Permanent Address | 123 flowerpot lane<br>celophane town MI |
| Email Address | nylon@dowpont.com |
| Telephone Number | 123-456-789 |
| Fax Number | 123-456-788 |
| Birthdate | 23/07/1970 |
| Special Interest | Plastics |
| Other Details | Graduated of Yale |
| Membership Level | Full Membership |
| Email Receipt for Idea Contributions? | Yes    No |

( Submit )  ( Cancel )

FIG 55A

About IDEA SHARES

What are Idea Shares?
Who benefits from the sale of Idea Shares?

What are Idea Shares?

At Idea Space, each individual idea contributed has prospective value. This value is represented by Idea Shares. Just as a company's shares represent a prospective value of a company in the stock market, Idea Shares represent a prospective value of ideas at Idea Space. Each time you add an idea to an idea tree, you automatically receive contingent contractual rights to the idea in the form of Idea Shares, which can be sold in full or in part to other interested parties. For a small fee, Idea Space acts as an escrow service, ensuring that these transactions proceed smoothly.

Who benefits from the sale of Idea Shares?

Inventors who do not wish to wait until the patent rights to ideas they have contributed are sold by Idea Space benefit when they receive payment much sooner than would otherwise be possible.

Share Prospectors who recognize a good idea when they see one may profit buying and selling Idea Shares according to their calculations of risk and value.

Prospective Buyers of Patent Rights are likely to be attracted to idea trees with a high proven transaction value.

FIG 55B

Prospective Buyers of Patent Rights may wish to purchase Idea Shares to the ideas in a tree before attempting to purchase the full patent rights to a tree as a means to reduce their overall purchasing costs, or to help insure against the potentially complete loss of prospective economic gain to a competitor. This is possible because owners of Idea Shares are compensated by either a portion of the income generated by the sale of the patent rights, patent license rights or even a royalty for each use of the patent.

Of course if you are the contributor of an idea you are not obligated to sell your idea shares at any time. When an idea tree's patent rights are sold, your Idea Shares will automatically be converted into a combination of monetary profits, percentage ownership of the eventual patent, and/or royalty on usage of the patent. The exact combination of these is determined by the elections of the Idea Share owners, the Buyer of Patent Rights, and/or the rules set forth for this process by Idea Space.

Home About Log-in Sign-up

FIG 56

Idea Owner Marketing Options Configuration Screen

The following Idea:

<idea> may be configured for marketing with the following options:

Do not offer this idea for sale to interested parties.

Accept bids from interested parties without obligation to sell.

List this Idea for automatic sale to anyone at a fixed price of $ [_____]

Auction this Idea to the highest bidder. Start bidding at $ [_____]
Receive bids until the following date of [_____]

Transfer this Idea immediately to the following Idea Space member
[_____]

( Submit ) ( Back )

FIG 57

Idea Prospector Information Screen

The following Idea:

<idea> whose contingent contractual rights are owned by:

George Gearless is listed as:

Not For Sale ( Back )

FIG 58

Idea Prospector Information Screen

The following Idea:

<idea> whose contingent contractual rights are owned by:

George Metri Euclid is listed as:

Accepting bids from interested parties.

My bid is [_____]  ( Submit )  ( Back )

Bidding History:

01/02/02 Tom Edison bids $5500.00

01/02/02 Albert Newton bids $4000.00

11/01/02 George Gearless bids $3000.00

FIG 59

Idea Prospector Information Screen

The following Idea:

<idea> whose contingent contractual rights are owned by:

George Gearless is listed as:

For Sale to anyone at a fixed price of $5000.00.

( Purchase This Idea )　( Back )

FIG 60

Idea Prospector Information Screen

The following Idea:

<idea> whose contingent contractual rights are owned by:

Inspector Hawkins is listed as:

Available to the highest bidder.

Bidding closes on the date of 02/02/02

Current minimum bid is $3500.01

My bid is [          ]  ( Submit ) ( Back )

Bidding History:

01/02/01 George Gearless bids $3500.00

01/02/01 Tom Edison bids $3300.00

01/01/02 George Gearless bids $2500.00

01/01/02 Bidding Starts at $2499.99

MANAGEMENT AND PUBLICATION OF IDEAS FOR INVENTIONS ACCUMULATED IN A COMPUTER DATABASE

CROSS REFERENCE TO RELATED APPLICATIONS

This is a divisional of U.S. patent application Ser. No. 10/072,071 filed Feb. 8, 2002; which is a continuation-in-part of U.S. patent application Ser. No. 09/980,654 filed Oct. 25, 2001; which was the National Stage of International Application No. PCT/US01/25317 filed Aug. 10, 2001; which claims the benefit of provisional Application No. 60/227,687 filed Aug. 24, 2000, and provisional Application No. 60/224,944 filed Aug. 11, 2000.

BACKGROUND AND SUMMARY OF THE INVENTION

The present invention pertains to management and publication of ideas for inventions accumulated in a computer database. The accumulated ideas may include needs, problems, solutions, requirements, discoveries and/or inventions and/or be systematically accumulated prior to filing patent applications for inventions derived at least in part from the accumulated ideas. A discovery of a problem, need or requirement calling for a solution is commonly an integral idea-component of an invention.

The present invention provides a method of managing ideas for prospectively patentable inventions, comprising the steps of:
(a) causing a computer system to execute instructions that cause accumulation of idea contributions for prospectively patentable inventions in a computer database;
(b) causing the computer system to execute instructions that cause the systematic establishment of contractual obligations by contributors of said idea contributions to said database to transfer property rights under patent rights to inventions respectively derived at least in part from said contributed ideas to a proprietor of said database or to a party in concert with said proprietor; and
(c) prior to filing any patent applications for any particular inventions derived at least in part from said accumulated idea contributions, causing the computer system to execute instructions that cause the systematic publishing of said accumulated idea contributions that said particular inventions are derived from.

The foregoing steps are performed by one party or by different parties in concert with one another.

The present invention also provides computer readable storage media, comprising computer executable instructions for causing a computer to manage ideas in accordance with the method of the present invention.

Additional features of the present invention are described with reference to the detailed description of the preferred embodiments.

BRIEF DESCRIPTION OF THE DRAWING

FIG. 1 is a diagram illustrating various aspects of the present invention.

FIG. 1A is a diagram showing in greater detail some of the "contractual obligations" by idea contributors shown only generally in the diagram of FIG. 1.

FIG. 1B is a diagram showing four alternative embodiments of the "enable viewing" function shown only generally in the diagram of FIG. 1.

FIG. 1C is a diagram showing in greater detail the "listings" shown only generally in the diagram of FIG. 1.

FIGS. 3 through 60 are views of various screen displays provided from a website to a user upon accessing an idea database in accordance with the present invention, wherein FIGS. 19 through 42 are related to browsing the exemplary embodiment of the integrated idea that is organized as shown FIG. 2. Views of screen displays overlapping two sheets of drawing are identified by a common FIG. number and A and B suffixes.

DETAILED DESCRIPTION

Figure 2:
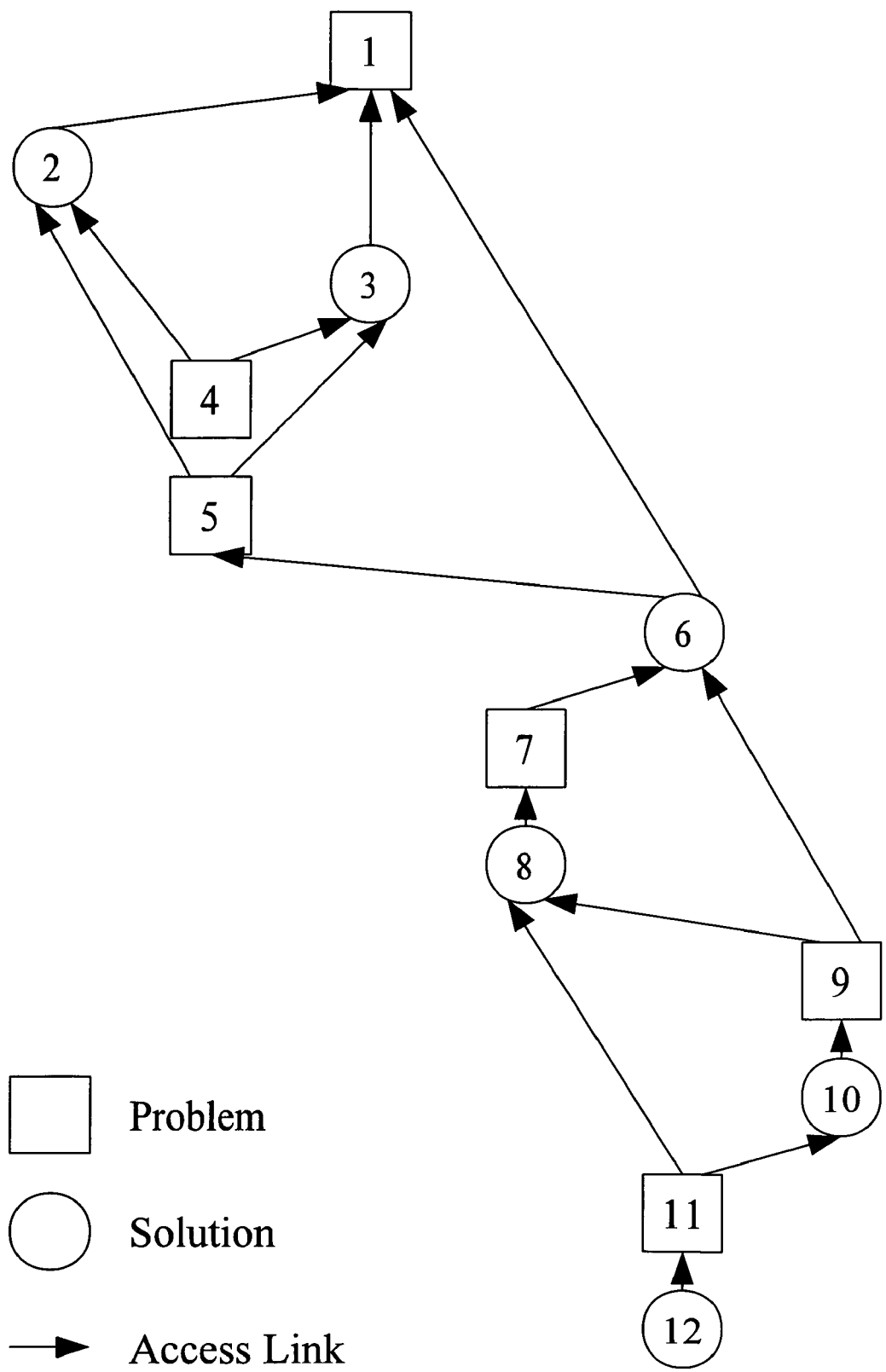
FIG. 2 is a diagram of an exemplary embodiment of the organization of an integrated idea in a computer database, wherein problem ideas are indicated by squares and solution ideas are indicated by circles.

Referring to FIG. 1, in a preferred embodiment of the present invention, an idea manager 20 maintains a computer system 21 and a computer database 22 for accumulating ideas for prospectively patentable inventions. The accumulated ideas include needs and requirements of such inventions and/or are systematically accumulated prior to filing any patent applications for inventions respectively derived at least in part from the accumulated ideas. The idea manager 20 is the proprietor of the computer database 22. The computer system 21 is adapted by hardware, firmware and/or software for performing and/or enabling performance of the various methods described herein.

The computer system 21 may include one or more computers and one or more memories contained within or coupled to the computer(s). The idea manager 20 may be one party or different parties operating in concert with one another. Idea contributors use computers 27 to view 25, 26 the ideas accumulated in the database 22. One idea contributor can be the idea manager 20, including its staff and/or its computer system 21. Some contributor computers 27 may be shared by a plurality of contributors. Potential customers for property rights, including patent rights, to prospectively patentable inventions 24 derived at least in part from the ideas accumulated in the database 22 use computers 28 to view 25, 26 the accumulated ideas in the database 22 when viewing is enabled 23 by the computer system 21. In some embodiments, the contributor computers 27 may be the same as the customer computers 28 and/or the computers of the computer system 21. Some viewings 25 of the ideas from the database 22 are so restricted by non-disclosure agreements by the viewers as not to constitute a publication of the ideas; and some viewings 26 of the ideas from the database 22 are enabled without restriction and thereby constitute a publication of the ideas.

The computer system 21 is programmed by the idea manager 20 to facilitate use of the contributor computers 27 to make on-line contributions of ideas 30, 31, 32 to the computer database of ideas 22. Computer programs that enable the contributor computers 27 to be used to make on-line contributions of ideas to the database 22 can be downloaded by the contributor computers 27 from the computer system 21. An on-line contribution is a contribution that is made over a communication network, such as the Internet.

In some preferred embodiments, the computer system 21 is programmed to require persons to enter into a membership as a prerequisite for viewing a portion of the database 22 containing at least some of the accumulated ideas, and to facilitate entry into such membership by on-line communications between the computer system 21 and the contributor computers 27. Entry into such a membership can also be effected by other means, such as by mail. Upon entering into a viewer membership, a person agrees to give up some legal rights. In alternative embodiments, no such membership is required for on-line viewing of any portion of the database 22 by the general public.

In some preferred embodiments, the computer system 21 is programmed to require contributors of ideas for prospective entry into the database 22 to enter into a membership as a prerequisite for contributing ideas for entry into the database 22, and to facilitate entry into such membership by on-line communications between the computer system 21 and the contributor computers 27. Entry into such a membership can also be effected by other means, such as by mail. Upon entering into a contributor membership, a person agrees to give up some legal rights and/or to transfer some property rights with respect to ideas contributed by such person. In some of the embodiments with such a membership requirement, the membership is limited to any entity that agrees to transfer or otherwise encumber property rights, including patent rights, to any inventions derived from any idea contributed by the entity. In alternative embodiments, no such membership is required for contributing ideas for entry into the computer database 22.

In some preferred embodiments, the computer system 21 is programmed to systematically establish contractual obligations 29 by contributors of the ideas to the database 22 and to facilitate establishment of such obligations 29 by on-line communications between the computer system 21 and the contributor computers 27. With regard to some of the contractual obligations 29, in some embodiments the persons that are obligated generally are not employees of the proprietor 20 or employees of a party in concert with the proprietor 20.

Referring to FIG. 1A, in the preferred embodiments, these systematically established contractual obligations 29 include one or more of the following:

obligations 33 by contributors of ideas to the computer database 22 to transfer property rights, including patent rights, to inventions respectively derived at least in part from the contributed ideas to transferees other than contributors of ideas of needs and/or requirements of the respectively derived inventions;

obligations 35 by contributors of ideas to the computer database 22 to transfer property rights, including patent rights, to inventions respectively derived at least in part from the contributed ideas to the proprietor 20 of the computer database 22 or to a party in concert with the proprietor 20;

nondisclosure agreements 37 pertaining to given ideas accumulated in the database 22 and consummated by persons whom have entered into a membership as a prerequisite for contributing ideas to the computer database 22 and/or for viewing the accumulated ideas;

joint inventor agreements 39 consummated by persons whom have entered into a membership as a prerequisite for contributing ideas to the computer database 22 and/or for viewing the accumulated ideas and agreeing to file as a joint inventor any patent application for any invention derived from a combination of any ideas contributed to the database 22 by such person and given accumulated ideas contributed to the database 22 by other persons;

delayed filing of patent application agreements 41 consummated by persons whom have entered into a membership as a prerequisite for contributing ideas to the computer database 22 and/or for viewing the accumulated ideas and agreeing not to file, without permission of the proprietor 20 of the computer database 22, a patent application for any invention related to a given idea accumulated in the database 22 until after an established period of time subsequent to accumulation of the given idea;

third party source identification agreements 43 consummated by persons whom have entered into a membership as a prerequisite for contributing ideas to the computer database 22 and/or for viewing the accumulated ideas and agreeing to disclose the identity of any third-party sources of ideas contributed by such person that are related to given ideas accumulated in the database 22; and inventor identification agreements 45 consummated by persons whom have entered into a membership as a prerequisite for contributing ideas to the computer database 22 and/or for viewing the accumulated ideas and agreeing to disclose the identity of each inventor of any invention derived from ideas contributed by such person that are related to given ideas accumulated in the database 22.

In some embodiments, the idea manager 20 facilitates transfer of property rights 44, 48 by the contributors of ideas to the computer database 22. In some of these embodiments, the transfer of property rights 44, 48 is to transferees other than contributors of ideas from which the invention was at least in part derived. In some of the embodiments, the transfer of property rights 44 is to a proprietor of the database 22, such as the idea manager 20, or to a party in concert with such proprietor 20. In some of these embodiments, the transferees are not identified upon establishing such obligations; and in some of these embodiments, the transferees are identified upon establishing such obligations.

In some embodiments, the transfer of property rights 44, 48 and/or the contractual obligations 29 to transfer property rights are in exchange for contingent economic gain, such as for example: contingent contractual rights 40 or shares of a portfolio of such contractual rights, or stock in the database proprietor 20 or a party in concert with the database proprietor 20. In some of these embodiments, the transfer of property rights 48 and/or the contractual obligations 29 to transfer property rights are in exchange for actual economic gain 42, such as for example: cash or bonds.

In some embodiments, the computer system 21 is programmed to systematically provide the contributors of ideas with contingent contractual rights 40 to at least some inventions derived at least in part from the ideas accumulated in the database 22, and to facilitate provision of such contingent rights in a marketable format, such as an electronically tradable certificate, by on-line communications between the computer system 21 and the contributor computers 27, or as described below with reference to FIGS. 55-60. The idea manager 20 systematically provides contingent contractual rights 40 to at least some of the contributors of ideas to the database 22 as an incentive for all or selected contributors to contribute ideas to the database 22; and/or compensates by economic gain 42 at least some contributor-owners of the contingent contractual rights in exchange for either acquiring 44 or facilitating transfer 48 of at least some of the property rights. The contingent contractual rights 40 include rights to a portion of anticipated income derived from property rights under the patent rights to prospectively patentable inventions 24 derived at least in part from the ideas contributed by the contributors whom receive such contingent contractual rights 40.

The computer system 21 is programmed to enable receipt of contributions of ideas for prospective entry into the database 22, and to facilitate receipt of such contributions on-line from the contributor computers 27. In some preferred embodiments, the computer system 21 is programmed to systematically enter into the database 22 all the ideas contributed for entry into the database 22 without requiring any contributor of such ideas to have subject matter expertise as a prerequisite for entry of such contributions. In other preferred embodiments, the computer system 21 is programmed to require contributors of ideas to the database 22 to have subject matter expertise as a prerequisite for contributing ideas for prospective entry into the database 22, and facilitate entry of evidence of such expertise by on-line communications between the computer system 21 and the contributor computers 27. Such evidence can also be effected by other means, such as by mail. In still other preferred embodiments, the computer system 21 is programmed to selectively enter only some of the contributed ideas into the database 22. In some embodiments, selective entry is accomplished by systematic computer screening for relevant subject matter. In some embodiments, selective entry is accomplished by systematic computer screening for keywords and by a computer operator making a selective entry decision based upon the context in which the keywords are used.

In alternative preferred embodiments, the computer system 21 is programmed to enable persons, whom have entered into a membership as a prerequisite for contributing ideas to the computer database 22 and/or for viewing the ideas accumulated in the database 22, and have consummated nondisclosure agreements 37, joint inventor agreements 39, delayed filing of patent application agreements 41, third party source identification agreements 43 and/or inventor identification agreements 45, as described above with reference to FIG. 1A, to contribute ideas to the computer database 22.

In some preferred embodiments, the computer system 21 is programmed to systematically establish contractual obligations by the idea contributors to permit immediate public disclosure of the ideas contributed by the idea contributors, and to facilitate establishment of such obligations by on-line communications between the computer system 21 and the contributor computers 27. Preferably such permission is for immediate public disclosure of all of the ideas contributed by the contributor undertaking such contractual obligation. In some of these embodiments, the ideas received from such contributors and accumulated in the computer database 22 are immediately disclosed to the public upon receipt by entry into a publicly viewable portion of the database 22 and thereby systematically published prior to filing any patent applications for inventions respectively derived at least in part from such accumulated ideas. In other such embodiments, the disclosure is not effected or not effected immediately notwithstanding having permission to do so.

In some preferred embodiments, the computer system 21 is programmed to record (a) the time of receipt of each idea contributed for entry into the database 22; (b) the time of publication in the database 22 of each accumulated idea; (c) the time of first viewing of each idea contributed to the database; and/or (d) the time of first public viewing from the database 22 of each accumulated idea, as indicated at 36 in FIG. 1.

In alternative preferred embodiments, the computer system 21 is programmed to enable 23 persons, whom have entered into a membership as a prerequisite for contributing ideas to the computer database 22 and/or for viewing the ideas accumulated in the database 22, and/or have consummated nondisclosure agreements 37, joint inventor agreements 39, delayed filing of patent application agreements 41, third party source identification agreements 43 and/or inventor identification agreements 45, as described above with reference to FIG. 1A, to view 25, 26 accumulated ideas from the computer database 22, including ideas not respectively contributed by such persons.

In some embodiments, the computer system 21 is programmed to enable 23 persons, whom have not entered into a membership as a prerequisite for viewing the ideas accumulated in the database 22, to view 26 accumulated ideas from the computer database 22, including ideas not respectively contributed by such persons.

Four different embodiments of the timing of the enable viewing function 23 are described with reference to FIG. 1B. These four embodiments are applicable for viewing by both persons whom have entered into a membership as a prerequisite for contributing ideas to the computer database 22 and/or for viewing the ideas accumulated in the database 22 and persons whom have not entered into such a membership.

In one such embodiment, as shown by line 51, viewing of a given accumulated idea in the database 22 is systematically enabled 23 immediately subsequent to accumulation 53 of the given idea in the database 22.

In another such embodiment, as shown by line 55, viewing of a given accumulated idea in the database 22 is systematically enabled 23 only after an established period of time 57 subsequent to accumulation 53 of the given idea in the database 22.

In still another such embodiment, as shown by line 59, viewing of a given accumulated idea in the database 22 is systematically enabled 23 immediately subsequent to filing a patent application 61 for an invention derived at least in part from the given accumulated idea.

In a further embodiment, as shown by line 63, viewing of a given accumulated idea in the database 22 is systematically enabled 23 only after an established period of time 65 subsequent to the filing a patent application 61 for an invention derived at least in part from the given accumulated idea.

The respective established periods of time subsequent to accumulation of the given idea 57, and subsequent to filing of a patent application 65 may be different per se and may be different with respect to enablement of viewing by persons whom have entered into such a membership and enablement of viewing by persons whom have not entered into such a membership.

Referring to FIG. 1C, the computer system 21 is programmed to systematically communicate online individually to computers 27 of persons, whom have entered into a membership as a prerequisite for contributing ideas to the computer database 22 and/or for viewing the ideas accumulated in the database 22, a listing 70 of ideas viewed from the database by said persons, a listing 72 of groups that include ideas viewed from the database by such persons; and/or a listing 74 of ideas contributed to the database by such persons.

The computer system 21 is programmed to enable ideas contributed by one or different contributors to the database 22 to be integrated within the database 22 to thereby facilitate derivation of inventions 24 from the integrated ideas, as indicated at 34 in FIG. 1. For example, a first idea 31 contributed by a first member using the computer 27a is integrated with a second idea 32 contributed by a second member using the computer 27b to provide an integrated idea of a prospectively patentable invention 24. In another example, ideas contributed from the same computer by one or different contributors are integrated within the database 22.

In the preferred embodiment, the related ideas that are processed to provide an integrated idea include problems and solutions. Preferably, an integrated idea is organized in the database as shown in FIG. 2 by providing access links between a problem idea (square) and one or more solution ideas (circle), and access links between a solution idea and one or more problem ideas, but generally not between a plurality of problem ideas or between a plurality of solution ideas. In this exemplary embodiment, three solution ideas 2, 3, 6 have been contributed in response to contribution of an initial problem idea 1; two problem ideas 4, 5 have been contributed in response to contribution of both of the solution ideas 2, 3, a solution idea 6 has been contributed in response to both of the problem ideas 1, 5; two problem ideas 7, 9 have been contributed in response to contribution of the solution idea 6; a solution idea 8 has been contributed in response to the problem idea 7; a problem idea 9 has been contributed in response to both of the solution ideas 6, 8; a solution idea 10 has been contributed in response to the problem idea 9; a problem idea 11 has been contributed in response to both of the solution ideas 8, 10; and a solution idea 12 has been contributed in response to the problem idea 11.

The idea contributions shown in FIG. 2 are described below in chronological order.

Problem Idea 1: Breaking Spectacles

Spectacle frames often break so that a lens will not adhere to the frame and the frame may twist out of shape and not tack on to the head. The spectacle user often is dependent on only one set of spectacles and it may take a week before they can have new frame or spectacles or have the old frame fixed. Is there a simple way for an ordinary person to temporarily fix her glasses?

Solution Idea 2: Use Glue

Glue the frame together with super glue.

Solution Idea 3. Use Glue

Glue the frame to the glass and buy new spectacles.

Problem Idea 4: Glue Doesn't Work

I have tried gluing with all kinds of glue but nothing has worked.

Problem Idea 5: Glue Doesn't Work

Spectacle frames are made of glass and all kinds of plastics and all kinds of metals, it is not likely that any glue can be made which will glue all of these materials. See Reference "Fix It Yourself"

Solution Idea 6: Use Shrink Wrap Tubes

I have access to the "Co-Brain" software, which suggests the alternative "fasten with shrink-wrap" to "fasten with glue". Maybe you could have a small tube of shrink-wrap in the shape of a soda-straw, fit the lens and spectacles together so that the thin and soft shrink-wrap fits over the broken section of the frame and put the spectacles in the micro-oven for shrinking.

Problem Idea 7: Tubes Don't Fit

The soda straw solution will only work for some lucky cases. Most often the spectacle frame breaks near the arch or the ear attachment and the soda straw solution will not work because the tube will only fit on one side of the broken frame.

Solution Idea 8: Shrink Wrap Entire Frame (1) Make a larger tube of shrink wrap with a diameter about the size of the frame around the lens, (2) Cut a thin sliver from the end of the tube with scissors in the form of a circular band, (3) Combine the spectacle parts and wrap the band around the broken frame around the lens, and (4) Use a hair dryer or other means to heat the combination.

Problem Idea 9: Lacks Appeal

The color of the shrink-wrap could in some cases look very ugly.

Solution Idea 10: Clear Choice

The shrink-wrap should be transparent.

Problem Idea 11: Unsuitable Plastic

Some shrink-wraps would not be suitable because they are not elastic enough for the fit of the circular band around the broken frame around the lens.

Solution Idea 12: Suitable Plastic

A suitable plastic can be bought from "Doww Chemicals" and is called Chemical X.

Reference: "Doww Plastic Facts"

The idea manager provides a website from which the computer database of ideas can be accessed for viewing and/or for entry of ideas into the computer database. Access to the database usually is over the Internet. A display of the web site provides a menu from which a user may select listings of (a) titles of the most recently contributed ideas; (b) titles of ideas that have received the most hits by users accessing the database; (c) integrated ideas combining the greatest number of prior ideas (such as the individual files respectively providing reference to the greatest number of files that are related either directly or indirectly to the identification code of another idea in the database); (d) the most recent integrated ideas (e) the identification codes of the contributors whom have supplied the most ideas to the database; and (f) the identification codes of the contributors whom have supplied the most ideas to the database for which rights have been provided/transferred. Such listings include links for accessing the ideas listed therein. Users can register for being notified by email of new entries of ideas having selected key words in the idea title and/or text; and such users are then so notified. The email notification includes a link to the new entry in the database.

A contributor enters an idea by text and/or attachment entry and/or by using software downloaded from the idea manager's website, or otherwise provided by the idea manager (such as in a CD), to enter drawings.

In an exemplary embodiment, the website is named "Idea Space". The display screens that are provided to a user of the idea database are shown in FIGS. 3 through 54. The underlined portions of the various display screens provide links to either other display screens or to other portions of the display screen then being displayed.

Figures 10A, 10B:

The screen display of the home page of the website is shown in FIG. 3. The home page provides links to the screen displays shown in FIGS. 4, 6 and 7. The underlined text in the "What is Idea Space" section of the "About Idea Space" screen display of FIG. 4 provides links to definitions of the respective underlined text in a "Glossary of Terms" screen display shown in FIG. 5. The "Submit" button at the bottom of the "Member Sign-up" display screen of FIG. 7 provides a link to the "Acceptance . . . " display screen shown in FIG. 8. Links to the "How to Participate" display screen of FIG. 9 and the "Examples of Member Profit" display screen of FIG. 10 are provided near the bottom of the "About Idea Space" display screen of FIG. 4.

A link to the Start Page screen display of FIG. 11 is provided by the "log in" button on the Member Log-in screen display of FIG. 6. Referring to the Start Page screen display, clicking the "Publish an Idea" link provides the screen display of FIG. 12; clicking the "Search for Contributions" link provides the screen display of FIG. 13; clicking the "Most Active Invention Trees" link provides the screen display of FIG. 14; clicking the "Trees by Topics" link provides the screen display of FIG. 15; clicking the "Trees by Bid Value" link provides the screen display of FIG. 16; clicking the "Your Saved Watch List" link provides the screen display of FIG. 17; and clicking the "Your Idea Space Status" link provides the screen display of FIG. 18.

Upon displaying the "Topics of Invention Trees" screen display of FIG. 15, a user can select and browse prior contributions that have been published in the database. The "Breaking Spectacles" link provides access to the exemplary integrated idea described above with reference to FIG. 2, beginning with the screen display of FIG. 19. The format of the screen display for a selected idea (as shown in FIGS. 19-42) includes a "Current Idea Selection" section, a Parent section, a "Child Idea(s)" section, a first "Connection Link" section between the Parent section and the Current Idea Selection section, and a second "Connection Link" section between the Child Idea(s) section and the Current Selection section.

The Current Idea Selection section contains a Description of the selected idea and a Vote window and lists the Entry Type of the selected idea, such as "Problem or Need" or "Solution"; the Author (contributor) of the selected idea, the Title of the selected idea, the Time of publication of the selected idea, a Rating of the appropriateness of the selected idea, any References related to the selected idea, and any Categories related to the selected idea. The Current Idea Selection section also includes Previous and Next buttons for accessing other contributed ideas that are linked to the same parent idea as the selected idea. The quantity of any such other linked contributed ideas are indicated beneath the Previous and Next buttons.

The Parent section contains a Vote window and lists the Type of the linked parent idea, such as "Problem or Need" or "Solution"; the Title of the linked parent idea, and, a Rating of the appropriateness of the linked parent idea. The Parent section also includes Previous and Next buttons for accessing other contributed parent ideas that are linked to the selected idea, and indicates the quantity of any such other linked contributed parent ideas.

The Child Idea(s) section contains a Description of the linked child idea and a Vote window and lists the Entry Type of the linked child idea, such as "Problem or Need" or "Solution"; the Title of the selected idea, and a Rating of the appropriateness of the linked child idea. The Child Idea(s) section also includes Previous and Next buttons for accessing other contributed child ideas that are linked to the selected idea, and indicates the quantity of any such other linked contributed child ideas.

The ratings are provided in response to averaging (or processing by some other formula) the votes by users of the database. Voting is accomplished by selecting a number within a range of 0 to 10 from a drop-down menu displayed by clicking the down-arrow in the Vote window. The listed rating shows the average (or other) rating and the number of voters. Ratings are also listed in the two "Connection Link" sections for the appropriateness of the respective links between the selected idea and either the idea in the Parent section or the idea in the Child Idea(s) section. The ratings provide a user of the database with an immediate indication of the appropriateness of the rated idea or connection link, as voted by other users.

In the screen display of FIG. 19, the selected idea described in the Current Idea Selection section is Problem Idea 1, and the child idea described in the Child Idea(s) section is Solution Idea 6, as described above with reference to FIG. 2. In the Child Idea(s) section, the "(2)" indication beneath the Next button indicates that there are two other child ideas linked to selected Problem Idea 1.

Figures 20A, 20B:
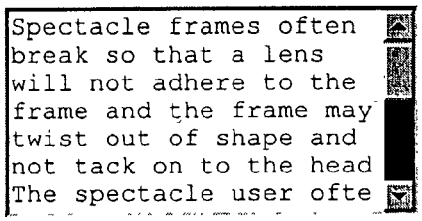
Figures 20A, 20B:

Clicking the Next button in the Child Idea(s) section of the screen display of FIG. 19 provides access to the screen display of FIG. 20, wherein the selected idea described in the Current Idea Selection section is Problem Idea 1, and the child idea described in the Child Idea(s) section is Solution Idea 3, as described above with reference to FIG. 2.

Figures 21A, 21B:

Clicking the Next button in the Child Idea(s) section of the screen display of FIG. 20 provides access to the screen display of FIG. 21, wherein the selected idea described in the Current Idea Selection section is Problem Idea 1, and the child idea described in the Child Idea(s) section is Solution Idea 2, as described above with reference to FIG. 2.

After returning to the initial screen display of FIG. 19, a screen display (as shown in FIG. 22), in which the child idea in the Child Idea(s) section of the screen display of FIG. 19 is displayed as the selected idea in the Current Idea Selection section, is accessed by clicking the "Move This Child Up" button in the Child Idea(s) section, in the screen display of FIG. 19.

In the screen display of FIG. 22, the selected idea described in the Current Idea Selection section is Solution Idea 6, the parent idea listed in the Parent section is Problem Idea 1, and the child idea described in the Child Idea(s) section is Problem Idea 7, as described above with reference to FIG. 2. In the Child Idea(s) section, the "(1)" indication beneath the Next button indicates that there is one other child idea linked to selected Solution Idea 6.

Figures 22A, 22B:
Figure 23A:

Clicking the Next button in the Child Idea(s) section of the screen display of FIG. 22 provides access to the screen display of FIG. 23, wherein the selected idea described in the Current Idea Selection section is Solution Idea 6, the parent idea listed in the Parent section is Problem Idea 1, and the child idea described in the Child Idea(s) section is Problem Idea 9, as described above with reference to FIG. 2.

After returning to the screen display of FIG. 22, a screen display (as shown in FIG. 24), in which the child idea in the Child Idea(s) section of the screen display of FIG. 22 is displayed as the selected idea in the Current Idea Selection section, is accessed by clicking the "Move This Child Up" button in the Child Idea(s) section, in the screen display of FIG. 22.

In the screen display of FIG. 24, the selected idea described in the Current Idea Selection section is Problem Idea 7, the parent idea listed in the Parent section is Solution Idea 6, and the child idea described in the Child Idea(s) section is Solution Idea 8, as described above with reference to FIG. 2. In the Child Idea(s) section, the "(0)" indication beneath the Next button indicates that there are no other child ideas linked to selected Problem Idea 7.

A screen display (as shown in FIG. 25), in which the child idea in the Child Idea(s) section of the screen display of FIG. 24 is displayed as the selected idea in the Current Idea Selection section, is accessed by clicking the "Move This Child Up" button in the Child Idea(s) section, in the screen display of FIG. 24.

In the screen display of FIG. 25, the selected idea described in the Current Idea Selection section is Solution Idea 8, the parent idea listed in the Parent section is Problem Idea 7, and the child idea described in the Child Idea(s) section is Problem Idea 11, as described above with reference to FIG. 2. In the Child Idea(s) section, the "(1)" indication beneath the Next button indicates that there is one other child idea linked to selected Solution Idea 8.

Clicking the Next button in the Child Idea(s) section of the screen display of FIG. 25 provides access to the screen display of FIG. 26, wherein the selected idea described in the Current Idea Selection section is Solution Idea 8, the parent idea listed in the Parent section is Problem Idea 7, and the child idea described in the Child Idea(s) section is Problem Idea 9, as described above with reference to FIG. 2.

After returning to the screen display of FIG. 25, a screen display (as shown in FIG. 27), in which the child idea in the Child Idea(s) section of the screen display of FIG. 25 is displayed as the selected idea in the Current Idea Selection section, is accessed by clicking the "Move This Child Up" button in the Child Idea(s) section, in the screen display of FIG. 25.

In the screen display of FIG. 27, the selected idea described in the Current Idea Selection section is Problem Idea 11, the parent idea listed in the Parent section is Solution Idea 8, and the child idea described in the Child Idea(s) section is Solution Idea 12, as described above with reference to FIG. 2. In the Child Idea(s) section, the "(0)" indication beneath the Next button indicates that there are no other child ideas linked to selected Problem Idea 11.

Figures 28A, 28B:

A screen display (as shown in FIG. 28), in which the child idea in the Child Idea(s) section of the screen display of FIG. 27 is displayed as the selected idea in the Current Idea Selection section, is accessed by clicking the "Move This Child Up" button in the Child Idea(s) section, in the screen display of FIG. 27.

In the screen display of FIG. 28, the selected idea described in the Current Idea Selection section is Solution Idea 12, the parent idea listed in the Parent section is Problem Idea 11, and no child idea described in the Child Idea(s) section.

After returning to the screen display of FIG. 26, a screen display (as shown in FIG. 29), in which the child idea in the Child Idea(s) section of the screen display of FIG. 26 is displayed as the selected idea in the Current Idea Selection section, is accessed by clicking the "Move This Child Up" button in the Child Idea(s) section, in the screen display of FIG. 26.

In the screen display of FIG. 29, the selected idea described in the Current Idea Selection section is Problem Idea 9, the parent idea listed in the Parent section is Solution Idea 8, and the child idea described in the Child Idea(s) section is Solution Idea 10, as described above with reference to FIG. 2. In the Child Idea(s) section, the "(0)" indication beneath the Next button indicates that there are no other child ideas linked to selected Problem Idea 9. In the Parent section, the "(1)" indication beneath the Next button indicates that there is one other parent idea linked to selected Problem Idea 9.

Figure 30A:

Clicking the Next button in the Parent section of the screen display of FIG. 29 provides access to the screen display of FIG. 30, wherein the selected idea described in the Current Idea Selection section is Problem Idea 9, the parent idea listed in the Parent section is Problem Idea 6, and the child idea described in the Child Idea(s) section is Solution Idea 10.

A screen display (as shown in FIG. 31), in which the child idea in the Child Idea(s) section of the screen display of FIG. 30 is displayed as the selected idea in the Current Idea Selection section, is accessed by clicking the "Move This Child Up" button in the Child Idea(s) section, in the screen display of FIG. 30.

In the screen display of FIG. 31, the selected idea described in the Current Idea Selection section is Solution Idea 10, the parent idea listed in the Parent section is Problem Idea 9, and the child idea described in the Child Idea(s) section is Problem Idea 11.

A screen display (as shown in FIG. 32), in which the child idea in the Child Idea(s) section of the screen display of FIG. 31 is displayed as the selected idea in the Current Idea Selection section, is accessed by clicking the "Move This Child Up" button in the Child Idea(s) section, in the screen display of FIG. 31.

In the screen display of FIG. 32, the selected idea described in the Current Idea Selection section is Problem Idea 11, the parent idea listed in the Parent section is Solution Idea 10, and the child idea described in the Child Idea(s) section is Solution Idea 12.

Figures 33A, 33B:

After returning to the screen display of FIG. 20, a screen display (as shown in FIG. 33), in which the child idea in the Child Idea(s) section of the screen display of FIG. 20 is displayed as the selected idea in the Current Idea Selection section, is accessed by clicking the "Move This Child Up" button in the Child Idea(s) section, in the screen display of FIG. 20.

In the screen display of FIG. 33, the selected idea described in the Current Idea Selection section is Solution Idea 3, the parent idea listed in the Parent section is Problem Idea 1, and the child idea described in the Child Idea(s) section is Problem Idea 4, as described above with reference to FIG. 2. In the Child Idea(s) section, the "(1)" indication beneath the Next button indicates that there is one other child idea linked to selected Solution Idea 3.

A screen display (as shown in FIG. 34), in which the child idea in the Child Idea(s) section of the screen display of FIG. 33 is displayed as the selected idea in the Current Idea Selection section, is accessed by clicking the "Move This Child Up" button in the Child Idea(s) section, in the screen display of FIG. 33.

In the screen display of FIG. 34, the selected idea described in the Current Idea Selection section is Problem Idea 4, the parent idea listed in the Parent section is Solution Idea 3, and no child idea described in the Child Idea(s) section.

After returning to screen display of FIG. 33, clicking the Next button in the Child Idea(s) section of the screen display of FIG. 33 provides access to the screen display of FIG. 35, wherein the selected idea described in the Current Idea Selection section is Solution Idea 3, the parent idea listed in the Parent section is Problem Idea 1, and the child idea described in the Child Idea(s) section is Problem Idea 5, as described above with reference to FIG. 2.

A screen display (as shown in FIG. 36), in which the child idea in the Child Idea(s) section of the screen display of FIG. 35 is displayed as the selected idea in the Current Idea Selection section, is accessed by clicking the "Move This Child Up" button in the Child Idea(s) section, in the screen display of FIG. 35.

In the screen display of FIG. 36, the selected idea described in the Current Idea Selection section is Problem Idea 5, the parent idea listed in the Parent section is Solution Idea 3, and Solution Idea 6 is child idea described in the Child Idea(s). A screen display (as shown in FIG. 37), in which the child idea in the Child Idea(s) section of the screen display of FIG. 36 is displayed as the selected idea in the Current Idea Selection section, is accessed by clicking the "Move This Child Up" button in the Child Idea(s) section, in the screen display of FIG. 36.

In the screen display of FIG. 37, the selected idea described in the Current Idea Selection section is Solution Idea 6, the parent idea listed in the Parent section is Problem Idea 5, and the child idea described in the Child Idea(s) section is Problem Idea 7. In the Child Idea(s) section, the "(1)" indication beneath the Next button indicates that there is one other child idea linked to selected Solution Idea 6.

Clicking the Next button in the Child Idea(s) section of the screen display of FIG. 37 provides access to the screen display of FIG. 38, wherein the selected idea described in the Current Idea Selection section is Solution Idea 6, the parent idea listed in the Parent section is Problem Idea 5, and the child idea described in the Child Idea(s) section is Problem Idea 9.

After returning to the screen display of FIG. 21, a screen display (as shown in FIG. 39), in which the child idea in the Child Idea(s) section of the screen display of FIG. 21 is displayed as the selected idea in the Current Idea Selection section, is accessed by clicking the "Move This Child Up" button in the Child Idea(s) section, in the screen display of FIG. 21.

In the screen display of FIG. 39, the selected idea described in the Current Idea Selection section is Solution Idea 2, the parent idea listed in the Parent section is Problem Idea 1, and the child idea described in the Child Idea(s) section is Problem Idea 4. In the Child Idea(s) section, the "(1)" indication beneath the Next button indicates that there is one other child idea linked to selected Solution Idea 2.

Figure 40A:

A screen display (as shown in FIG. 40), in which the child idea in the Child Idea(s) section of the screen display of FIG. 39 is displayed as the selected idea in the Current Idea Selection section, is accessed by clicking the "Move This Child Up" button in the Child Idea(s) section, in the screen display of FIG. 39.

In the screen display of FIG. 40, the selected idea described in the Current Idea Selection section is Problem Idea 4, the parent idea listed in the Parent section is Solution Idea 2, and no child idea described in the Child Idea(s) section.

After returning to screen display of FIG. 39, clicking the Next button in the Child Idea(s) section of the screen display of FIG. 39 provides access to the screen display of FIG. 41, wherein the selected idea described in the Current Idea Selection section is Solution Idea 2, the parent idea listed in the Parent section is Problem Idea 1, and the child idea described in the Child Idea(s) section is Problem Idea 5.

A screen display (as shown in FIG. 42), in which the child idea in the Child Idea(s) section of the screen display of FIG. 41 is displayed as the selected idea in the Current Idea Selection section, is accessed by clicking the "Move This Child Up" button in the Child Idea(s) section, in the screen display of FIG. 41.

In the screen display of FIG. 42, the selected idea described in the Current Idea Selection section is Problem Idea 5, the parent idea listed in the Parent section is Solution Idea 2, and the child idea described in the Child Idea(s) section is Solution Idea 6.

In the same manner, clicking the "Parent down" button moves the display of the parent down into the Current Idea Selection section.

Figure 44:

Referring again to the format of the screen display for a selected idea, as shown in FIG. 19, clicking the View Details button in the Current Idea Selection section provides access to the screen display of FIG. 43, which recites various details related to the selected idea in the Current Idea Selection section; and clicking the View Details button in the Connection Link section between the Current Idea Selection section and the Child Idea(s) section provides access to the screen display of FIG. 44, which recites various details related to the connection link between the current idea selection and the idea in the Child Idea(s) section The Publish an Idea screen display of FIG. 12 includes an upper section for describing a first idea, a lower section for describing a second idea and a Connection Link section. The first idea is linked to the second idea unless the link is removed by clicking the "Remove this Link" button in the Connection link section. The display in the upper section corresponds to the Current Idea Selection section of a browse-mode display screen, such as shown in FIG. 19. Text is manually entered into the Title and Description portions of the lower section. The entered text may be added to a queue for submission with other entries by clicking the Add to Queue button in the lower section.

The queue is a storage area of scratch book for members of the Idea Space website to store and organize sets of contributed ideas and sets of connection links before they are submitted to the Idea Space database. Contributed ideas and connecting links may then be submitted as a unit in a member-organized configuration. Connection links within the queue may connect two contributed ideas within the queue, two currently published contributed ideas within the database, or a contributed idea within the queue and a currently published contributed idea within the database. Until submitted to the database individually or as a part of a unit in a member-organized configuration, the idea files in the queue and/or their organization within one or more units, as defined by their connection links, may be modified, deleted, moved, or recombined by the user/member. New contributed ideas and connection links may be added to the queue. Means are provided for selecting contributed ideas and connection links for submission to the database as an organized unit or individually. Submission to the database is not limited by the order in which the contributed ideas and the connection links are created. Contributed ideas and connection links in the queue that are not submitted when other contributed ideas and connection links in the queue are submitted are saved for later manipulation and/or submission to the idea database. The computer system managing the Idea Space website database does not process or publish contributed ideas or related connection links until the entire unit containing the contributed ideas and the related connection links is submitted. Partially received units are treated in the same manner as a partially received contributed idea or a partially received connection link; and the same time of receipt is recorded for all of the contributed ideas and connection links that are submitted as part of a unit. Upon publication in the database, the same time of publication is listed for all of the contributed ideas and connection links that are submitted as part of a unit.

Referring again to the Publish an Idea screen display of FIG. 12, clicking the Add Reference button brings up the Add Reference screen display of FIG. 45, wherein an external reference may be identified by manually entering text in the Enter Reference Information space. Clicking the Submit button submits the identified external reference. If the user desires instead to enter an internal reference, the Internal Reference button is clicked.

Figures 46A, 46B:

Clicking the Internal Reference button brings up the Add Reference screen display of FIG. 46, wherein a Current Idea Selection in the database, such as shown in the screen display of FIG. 19, may be accessed and added as a reference by selecting the desired contributed idea in the same manner as described above in describing the browse mode by clicking the "Add this as the reference" button.

Upon clicking the Add Categories button in the Publish an Idea screen display of FIG. 12, the user is enabled to select and add a category or categories from a list or lists of classes and subclasses of the United States Patent and Trademark Office and/or the Standard Industrial Classification (SIC) system to the respective idea file. If an appropriate class and/or subclass does not exist the user has the option of creating a new class and/or subclass. Other lists of classes may be used as a means for categorizing ideas and appropriate selection means are displayed to the user. Upon submission of the selected category or categories, selected category is associated with contributed idea described in the screen display from in which the Add Categories button is clicked.

Clicking the Add Link button in the Publish an Idea screen display of FIG. 12 brings up the Add Link screen display of FIG. 47, wherein the Create the Link Here button is clicked to create the links shown in the Add Link screen display, after selecting the desired contributed idea in the same manner as described in describing the browse mode.

Referring to the Search for Contributions screen display of FIG. 13, clicking the Search by Keywords link brings up the screen display of FIG. 48. Clicking the search button in the screen display of FIG. 48 brings up the search results as shown in the screen display of FIG. 49.

Clicking the Search by Categories link in the Search for Contributions screen display of FIG. 13 brings up the screen display of FIG. 50. Clicking the search button in the screen display of FIG. 50 brings up the search results as shown in the screen display of FIG. 51.

Clicking the Search by Title Words link in the Search for Contributions screen display of FIG. 13 brings up the screen display of FIG. 52. Clicking the search button in the screen display of FIG. 52 brings up the search results as shown in the screen display of FIG. 53.

Clicking the Advanced Search link in the Search for Contributions screen display of FIG. 13 enables a member user of the database to search the database for contributed ideas and/or connection links based on one or more sets of fields of their selection within the contributed files and/or connection links. The advanced search utilizes Boolean operators to logically combine together selections defined by key word entries within the same and different search fields. Wild cards are allowed for the key word entries in all fields.

Clicking the Update Profile button in the Your Idea Space Status screen display of FIG. 18 brings up the screen display of FIG. 54. Note that the birth date of the user has been corrected in the screen display of FIG. 54.

In another preferred embodiment, the related ideas that are processed to provide an integrated idea in the database include contributed ideas of "problems with theories" and "solutions to problems with theories". Preferably an integrated idea in accordance with this preferred embodiment is organized in the database by providing access links between contributed ideas of "problems with theories" and "solutions to problems with theories" and vice versa but generally not between contributed ideas of "problems with theories" and contributed ideas of "problems with theories" or between contributed ideas of "solutions to problems with theories" and contributed ideas of "solutions to problems with theories". This preferred embodiment may have integrated ideas which are integrations of ideas of the other databases shown herein so that access links are preferably and generally created between contributed ideas of "solutions to problems with theories" and "problems with solutions and their enablement" and further between "problems with theories" and "solutions to problems and needs". Alternatively such preferred embodiment may not be so integrated.

In the various embodiments of this invention the step of facilitating contribution of ideas to a computer database of ideas can be carried out automatically by the computer system. One example of such step being carried out automatically by a computer system would be as follows. In the exemplary embodiment described with reference to FIG. 2, where Idea 4 is contributed as a child of Idea 2 this step is accomplished by a human contributor; and where Idea 4 is contributed as a child of Idea 3, this latter contribution is accomplished automatically by a computer that is used to manage and provide the idea database in response to the computer recognizing the similarity of the words of Idea 2 and Idea 3. Such technology is known, and for example, was provided at the time of filing this patent application by a "cobrain" website identified in the application. If an idea automatically contributed by a computer is inappropriate the idea will get a very low rating by the database users.

Another example of the step of facilitating contribution of ideas to a computer database of ideas being carried out automatically by a computer is as follows. Idea 10, which is based upon transparency, is contributed automatically by a computer owned and programmed by a member of the public in response to the computer recognizing the problem related to the word "color" in Idea 9. Such technology is also known, and for example, was provided at the time of filing this patent application by the "cobrain" website identified in the application.

Another example of computer processing of ideas to provide an integrated idea was provided at the time of filing this patent application by a "techoptimizer" website identified in the application, the disclosure of which is incorporated herein by reference thereto.

In some embodiments, the idea database 22 is maintained as a business by the idea manager 20, but is contributor and customer driven, in that some of the contributors 27 and some of the customers 28 suggest to the idea manager 20 when an idea is inappropriately located within the database 22 in relation to the search system. An idea file can be accessed by the search system by using a contributor identification code, a contributor-provided title; subject, keywords, time of entry into the database, time of publication (provision of access) on the database, time of first access of the idea entry, and/or the number of accesses to an idea entry. The time recordings are within an accuracy of one-one-hundredth or one-one-thousandth of a second. The search system is able to show a continuous listing of idea entries (files) in accordance with the time records.

In some embodiments, the time of entry into the database and the time of access from the database would be the same.

In some embodiments, the idea entries are never changed as a general rule, but may be repositioned in accordance with the search system.

In some preferred embodiments, the idea manager 20 systematically effects transfer of property rights to inventions 24 derived at least in part from the accumulated ideas to transferee customers, other than the contributors of the ideas from which the invention 24 was at least in part derived; and the computer system 21 is programmed to facilitate such transfers by on-line communications between the computer system 21 and the contributor computers 27 and/or the customer computers 28. Some such transfers that are pursuant to an obligation by the contributor to transfer such rights are to a transferee customer that was not identified upon establishment of said obligation.

In some preferred embodiments, the idea manager 20 systematically effects transfer of property rights 44 to inventions 24 derived at least in part from the accumulated ideas to itself 20 as the proprietor of the database 22 or to a party in concert with itself 20; and the computer system 21 is programmed to facilitate such transfers by on-line communications between the computer system 21 and the contributor computers 27 and/or the customer computers 28.

The transferred property rights 48 include rights to contributed ideas per se and/or at least some right under the patent rights to at least some of the inventions 24 derived at least in part from the ideas accumulated in the database 22, including both inventions derived from integrated contributed ideas and inventions innate to a single idea contributed by a single contributor.

Incident to facilitating transfer of such property rights 48, or independent of such transfer, the idea manager 20 (a) sells at least some right under the patent rights to at least some of the inventions 24; (b) auctions at least some right under the patent rights to at least some of the inventions 24; (c) brokers and/or markets at least some rights under the contingent contractual rights to at least some of the inventions 24; (d)

acquires at least some right under the patent rights to at least some of the inventions 24; and/or (e) facilitates public sale of the acquired rights to at least some of the inventions 24. In the preferred embodiment, such sale, auction, brokering, marketing, acquisition and facilitation of public sale are performed systematically. In alternative embodiments one or more of such sale, auction, brokering, marketing, acquisition and facilitation of public sale are not performed systematically.

In some preferred embodiments, the computer system 21 is programmed to enable transfer of contingent contractual rights 40 in a marketable format between an owner of contingent property rights 40 and another interested party. One embodiment of such a marketable format is described in the About IDEA SHARES screen display shown in FIG. 55, which may be accessed by clicking the About Idea Shares link in the About IDEA SPACE screen display shown in FIG. 4B.

The contributor of an idea is generally assigned ownership of contingent contractual property rights 40 upon contribution of the idea in exchange for transfer of property rights 44, 48 to the idea manager 20 or some other transferee. However, the contributor may specify another party unto which to initially assign ownership of the contingent contractual rights 40, such as the employer of contributor.

The current owner of a contingent contractual right 40 may elect, among other possible choices, to transfer, sell, or auction the contingent contractual rights 40 to other parties such as a party having a membership for the purpose of purchasing such contractual contingent rights 40. The computer system 21 is programmed to enable implementation of such choices by enabling only idea contributors whom own contingent contractual rights 40 to access an Idea Owner Marketing Options Configuration Screen display, such as shown in FIG. 56. Such access is effected by clicking a Marketing Options button in the Current Idea Section of a Solution type screen display, such as shown in FIG. 22A.

Depending upon which of the options shown in the screen display of FIG. 56 is selected and submitted, one of four different types of Idea Prospector Information Screen displays can be accessed when a person subsequently viewing the idea solution in the screen display of FIG. 22A clicks the Prospector Information button in the Current Idea Section of a Solution type screen display, such as shown in FIG. 22A.

When the "Do not offer this idea for sale to interested parties" option on the screen display of FIG. 56 has been selected and submitted, the Idea Prospector Information Screen display shown in FIG. 57 is displayed in response to clicking the Prospector Information button in the screen display of FIG. 22A.

When the "Accept bids from interested parties without obligation to sell" option on the screen display of FIG. 56 has been selected and submitted, the Idea Prospector Information Screen display shown in FIG. 58 is displayed in response to clicking the Prospector Information button in the screen display of FIG. 22A.

When the "List this Idea for automatic sale to anyone at a fixed price" option on the screen display of FIG. 56 has been selected and submitted, the Idea Prospector Information Screen display shown in FIG. 59 is displayed in response to clicking the Prospector Information button in the screen display of FIG. 22A.

When the "Auction this Idea to the highest bidder" option on the screen display of FIG. 56 has been selected and submitted, the Idea Prospector Information Screen display shown in FIG. 60 is displayed in response to clicking the Prospector Information button in the screen display of FIG. 22A. Bids submitted by use of the screen display of FIG. 60 are subsequently displayed in the Bidding History portion of such screen display.

Methods of selling contingent contractual rights 40 other than at a fixed price or auction also are enabled by the computer system 21, including combinations of the methods utilizing the screen displays of FIGS. 56-60, and such other methods may be based on other conditions provided by the idea manager 20, the owner of the contingent contractual rights or an interested party.

In the preferred embodiment, the idea manager 20 also systematically facilitates preparation and/or filing of patent applications for at least some of the unpatented inventions, as indicated at 50. Preferably, for some inventions, the step 48 of facilitating transfer of at least some right under the patent rights is carried out systematically before the step 50 of facilitating preparation and/or filing of a patent application. The computer system 21 is used to prepare and/or file a patent application for unpatented inventions innate to ideas in the database 22. Computer software for preparing patent applications from a database including an idea of an invention includes "Patent Pro" brand software available from Kernel Creations, Ltd. and "Patent Wizard" brand software available from Patent Wizard, LLC of Fargo, N. Dak. Computer software for filing patent applications in various national patent offices has been provided by the various national patent offices.

The idea manager 20 facilitates systematic filing of invention disclosure documents and/or patent applications disclosing some of the accumulated ideas that are new and/or related to accumulated ideas disclosed by previously filed disclosure documents and/or patent applications and accumulated in the computer database 22 subsequent to the filing of the previously filed disclosure documents and/or patent applications.

In some embodiments, a customer is enabled upon payment of a fee to file a first right of refusal to the property rights to a prospectively patentable invention. Such a filing can be accessed with the idea entry. Such rights may include contingent rights provided by the idea manager 20 and/or transferred property rights.

In some preferred embodiments the computer system 21 is programmed to publish the conditions for sale or license of property rights to at least some of the prospectively patentable inventions 24 in the database 22 and/or a history of sale or license of property rights to at least some of such inventions 24 by entering such conditions and history in the database 22 for public or member viewing. Examples of such conditions include: for sale, not for sale, will take bids, will sell to highest bidder before a specified date, will sell for a specified amount or to the highest bidder by a specified date. Examples of such a history include: sold to FSHP Company on a given date for a stated amount and licensed to General Plastics on a given date for a stated royalty.

Preferably all of the various functions described herein are performed systematically. In alternative embodiments some of the various functions described herein are not performed systematically.

The present invention further provides computer readable storage media for use with computer systems, wherein the computer readable storage media include computer executable instructions for causing computer systems to perform and/or enable performance of the various functions described herein.

In still other embodiments the various embodiments described herein are combined with one another to the extent that they are not incompatible with each other.

The benefits specifically stated herein do not necessarily apply to every conceivable embodiment of the present invention. Further, such stated benefits of the present invention are only examples and should not be construed as the only advantages of the present invention.

While the above description contains many specificities, these specificities are not to be construed as limitations on the scope of the present invention, but rather as examples of the preferred embodiments described herein. Other variations are possible and the scope of the present invention are to be determined not by the embodiments described herein but rather by the claims and their legal equivalents. The claims require no implicit limitations. Each claim is to be construed explicitly as stated, or by its legal equivalent.

We claim:

1. A computerized method of managing ideas for prospectively patentable inventions, comprising:
    (a) accumulating idea contributions for prospectively patentable inventions in a computer database;
    (b) establishing contractual obligations by at least some contributors of the idea contributions to the database to transfer property rights to inventions derived at least in part from the contributed ideas to a transferee;
    (c) publishing at least one of the accumulated idea contributions for one of the prospectively patentable inventions prior to filing any patent application for the invention; and
    (d) facilitating transfer of some of the property rights to a customer who obtains property rights to one or more of the prospectively patentable inventions, wherein subsequent to the publishing at least one patent application for the one or more inventions is filed.

2. The method according to claim 1, additionally comprising receiving a consent to a non-disclosure agreement from each contributor of the idea contributions before the idea contributions are accumulated in the computer database.

3. A method of managing ideas, in a computer database, for prospectively patentable inventions, the method comprising:
    (a) obtaining patent rights to a prospectively patentable invention for which
        (i) idea contributions are accumulated in a computer database,
        (ii) contractual obligations by at least some contributors of the idea contributions to the database to transfer property rights to inventions derived at least in part from the contributed ideas to a transferee are established, and
        (iii) at least one of the accumulated idea contributions for the prospectively patentable invention is published prior to filing any patent application for the invention; and
    (b) subsequent to the publishing, filing at least one patent application for the invention.

4. The method according to claim 3, additionally comprising receiving a consent to a non-disclosure agreement from each contributor of the idea contributions before the idea contributions are accumulated in the computer database.

* * * * *

UNITED STATES PATENT AND TRADEMARK OFFICE
CERTIFICATE OF CORRECTION

PATENT NO.        : 7,464,108 B1
APPLICATION NO.   : 10/309384
DATED             : December 9, 2008
INVENTOR(S)       : Jens Erik Sorensen and Jens Ole Sorensen It is certified that error appears in the above-identified patent and that said Letters Patent is hereby corrected as shown below:

| Column | Line | Description of Error |
|---|---|---|
| Page 1 Item (56) Col. 1 | 3 | Under U.S. Patent Documents, change "345/709" to --715/709--. |
| Item (56) Page 3 Col. 1 | 21 | Under Other Publications, change "patentwizard." to --www.patentwizard.--. |
| Item (56) Page 3 Col. 1 | 23 | Under Other Publications, change "Patent" to --Patent Pro--. |
| Item (56) Page 3 Col. 1 | 41 | Under Other Publications, change "harshawresearch." to --www.harshawresearch.--. |
| 13 | 52 | After "section" insert --.--. |

Signed and Sealed this

Twenty-second Day of December, 2009

David J. Kappos
*Director of the United States Patent and Trademark Office*